United States Patent [19]

Tanaka et al.

[11] Patent Number: 5,684,891
[45] Date of Patent: Nov. 4, 1997

[54] METHOD AND APPARATUS FOR CHARACTER RECOGNITION

[75] Inventors: Tetsuomi Tanaka, Yokohama; Shugoro Ueno, Tokyo; Hiroaki Ikeda, Yokohama, all of Japan

[73] Assignee: Canon Kabushiki Kaisha, Tokyo, Japan

[21] Appl. No.: 339,879

[22] Filed: Nov. 14, 1994

Related U.S. Application Data

[63] Continuation of Ser. No. 961,647, Oct. 16, 1992, abandoned.

[30] Foreign Application Priority Data

| Oct. 21, 1991 | [JP] | Japan | 3-272707 |
| Oct. 23, 1991 | [JP] | Japan | 3-275115 |
| Nov. 5, 1991 | [JP] | Japan | 3-288286 |
| Jul. 27, 1992 | [JP] | Japan | 4-199746 |

[51] Int. Cl.$^6$ ............................................ G06K 9/34
[52] U.S. Cl. ......................... 382/178; 382/176; 382/179
[58] Field of Search ........................... 382/173, 176, 382/177, 178, 179, 309, 310

[56] References Cited

U.S. PATENT DOCUMENTS

| 3,219,974 | 11/1965 | Rabinow | 382/178 |
| 3,969,700 | 7/1976 | Bollinger et al. | 382/177 |
| 4,206,442 | 6/1980 | Miyazaki | 382/178 |
| 4,344,152 | 8/1982 | Laurer et al. | 382/9 |
| 4,731,857 | 3/1988 | Tappert | 382/9 |
| 4,850,025 | 7/1989 | Abe | 382/9 |
| 4,933,977 | 6/1990 | Ohnishi et al. | 382/9 |
| 5,033,097 | 7/1991 | Nakamura | 382/9 |
| 5,050,219 | 9/1991 | Maury | 382/9 |
| 5,138,668 | 8/1992 | Abe | 382/9 |

FOREIGN PATENT DOCUMENTS 1037681  8/1989  Japan.

Primary Examiner—Leo Boudreau
Assistant Examiner—Chris Kelley
Attorney, Agent, or Firm—Fitzpatrick, Cella, Harper & Scinto

[57] ABSTRACT

This disclosure relates to a character recognition method and apparatus through which highly accurate character recognition is capable of being executed inexpensively and at high speed. Character recognition is raised in speed by executing segmentation of character images from an input image and character recognition from the segmented character images in parallel by separate processors without use being made of a special communication processor. After the character images have been segmented from the input image, the results of segmentation are evaluated and the character images are segmented further based upon the results of evaluation. Methods of evaluation include a method involving finding a standard character size from characters written in character images segmented initially, and adopting the difference between the standard size and the size of each segmented character image, and a method involving quantifying results of character recognition of character images segmented initially, and evaluating the results of quantification.

18 Claims, 39 Drawing Sheets

FIG. 20A
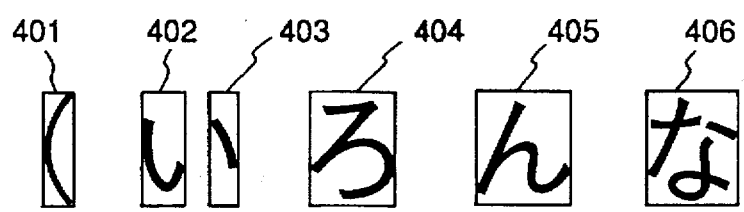
FIG. 20B
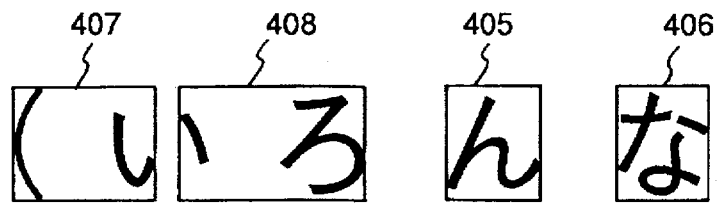
FIG. 20C
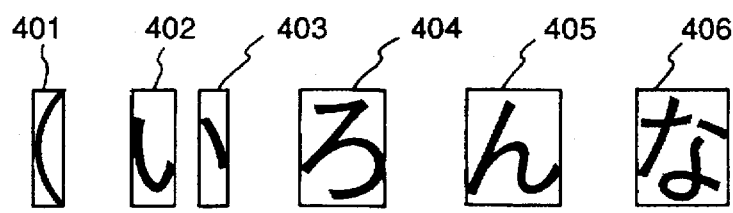
FIG. 20D
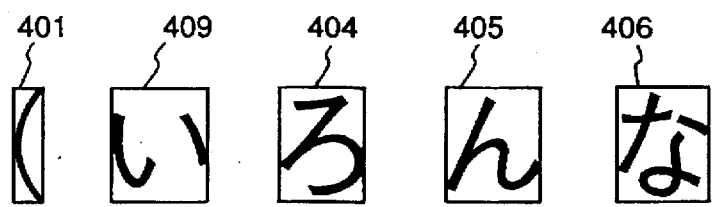
FIG. 20E

FIG. 24A  HAWAII

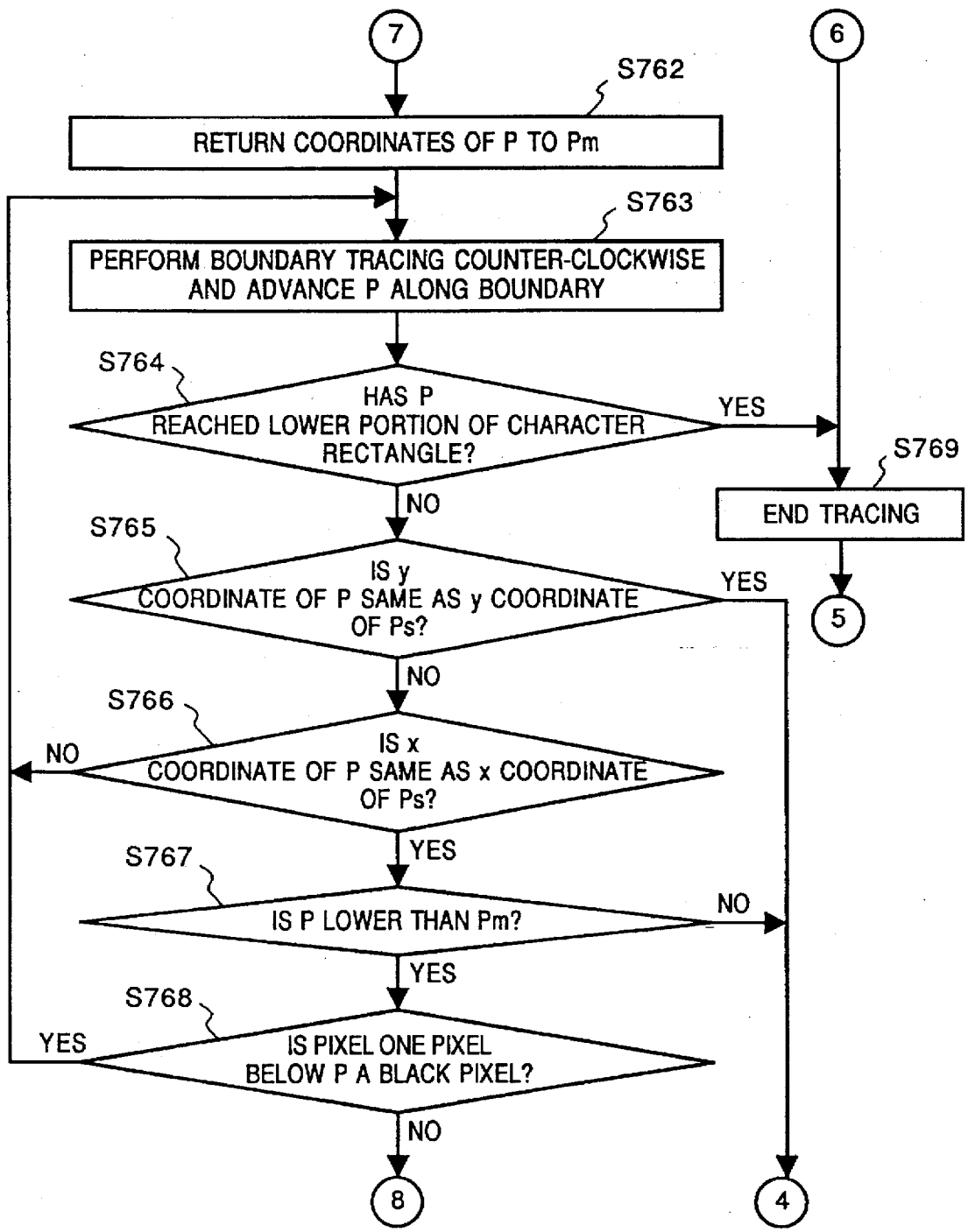
F I G. 26B

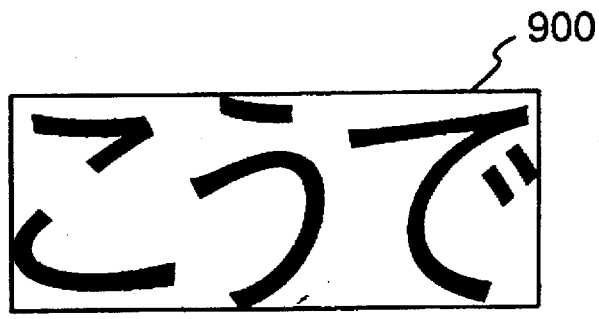
FIG. 37
HAWAII
FIG. 38
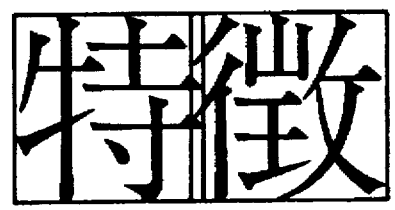
FIG. 39

METHOD AND APPARATUS FOR CHARACTER RECOGNITION

This application is a continuation of application Ser. No. 07/961,647 filed Oct. 16, 1992, now abandoned.

BACKGROUND OF THE INVENTION

1. Field of the Invention

This invention relates to a method and apparatus for character recognition and, more particularly, to a method and apparatus for character recognition in which characters are recognized upon being segmented from an input image.

2. Description of the Prior Art

Conventional methods and apparatus for recognizing characters in input images have various characterizing features. For example, an apparatus which executes segmentation and character recognition from an input image is composed of components that are separated from each other. The results of segmentation are transmitting using communication means and character recognition is executed based upon the communication data.

Also, in the procedure for character recognition processing, the conventional character recognition apparatus is structured in such a manner that, characters are segmented from an inputted image one at a time to extract the features, after which each character is subjected to pattern matching with respect to a standard character pattern, which has been prepared in advance, to compute the similarity with the features of a standard character, and the character having the highest degree of similarity is adopted as results of recognition.

There are two methods of segmenting characters from an input image. These are (1) a boundary tracing method in which a boundary is traced, and (2) a projection method for obtaining the projection of a character image. An overview of these methods will now be described.

(1) The boundary tracing method

This method involves tracing a boundary from one pixel on the boundary of a character image. For the sake of explanation, consider a coordinate system in which the upper left end of the input image is the origin, the x axis is directed to the right (the horizontal direction) and the y axis is directed downward (the vertical direction). First, let the starting point be a pixel of a character image of interest whose x and y coordinates are minimum. Next, this starting-point pixel is adopted at the pixel of interest, eight neighboring pixels surrounding this pixel of interest are investigated clockwise in ascending order starting from "1", as shown in FIG. 34, and the pixel of interest is shifted when the pixel of a character is found to be present. At this time the coordinates of this pixel are stored in memory. Though the eight neighboring pixels of this pixel of interest are then investigated, the order in which these eight neighboring pixels are investigated is such that when the present pixel of interest is at the position of "2" or "3" in FIG. 34 as seen from the previous pixel of interest, the investigation starts from "1" in FIG. 34. Further, the investigation starts from "3" when the present pixel of interest is at the position of "4" or "5"; from "5" when the present pixel of interest is at the position of "6" or "7"; and from "7" when the present pixel of interest is at the position of "8" or "1" When tracing thus returns to the starting point, segmentation ends.

(2) Projection method

This method involves extracting a rectangular area representing a one-line string, and then extracting a rectangular area representing one character. If we take the character string of lateral writing "文字認識装置" shown in FIG. 35 as an example and take a projection P1 upon a projection plane 801 in the horizontal direction, a rectangular area 803 having a height equivalent to the length (h) of P1 and representing the one-line string will be obtained. Further, when a projection is taken in the vertical direction with regard to the obtained rectangular area 803 representing the one-line string, projections P2~P7 (each of which is referred to as a "character block") upon a projection plane 802 are obtained. Thus, the characters are segmented.

Pattern-recognition processing executed by conventional character recognition apparatus can be summed up generally as shown in the flowchart of FIG. 36. In accordance with the procedure of the flowchart, the processing includes inputting an image original (step S901), segmenting characters from the input image one at a time (step S902), extracting the features of the character (step S903), thereafter computing the similarity with features, obtained in advance, according to category (step S904) and then adopting, as the results of recognition, the character which belongs to the category having the highest degree of similarity (step S905).

However, if processing is performed in accordance with the prior art described above, the results of character segmentation are transmitted, using communication means, to the apparatus which executes the character recognition, and therefore it is required that the apparatus incorporate means for managing the results of character segmentation. This is a factor in higher cost.

Further, the processing for transmitting the results of character segmentation requires the sequential execution of processing for data formation in accordance with a predetermined format, data storage and calling of data. A problem which arises as a result of this series of processing operations is that the character recognition processing requires a long period of time.

Character segmentation in accordance with the aforesaid prior art also involves the problems described below.

In case of the character segmentation method which relies upon boundary tracing method, the following problems arises because all of the coordinate values along the boundaries of the image are obtained:

(a) There is a great increase in the required storage capacity of the memory which stores the coordinate values.

(b) In a case where a character comprises a plurality of isolated strokes (e.g., two strokes if the character is "い" and five strokes if the character is "言"), decision processing is required to decide which strokes are combined to form one character.

(c) In a case where characters composed of one or more strokes are arranged as a sentence, the order demanded by the characters and the arrangement of the characters in the form of the sentence will not always agree. As a result, processing for rearranging the character blocks becomes necessary.

The foregoing factors lead to an increase in the memory of the apparatus and an increase in the time needed for character recognition processing.

Further, in case of the character segmentation method which relies upon projection, the following problem arises:

(d) In a case where there is not a proper amount of space between characters, unlike the ideal case shown in FIG. 35, space cannot be acquired and segmentation cannot be carried out. For example, this will occur if, in a horizontal character string, the left-most end of a character exists on the left side of the right-most end of the immediately preceding character.

More specifically, in a case where " こ ", " ゝ " and " て " of an input character pattern overlap, as shown in FIG. 37, for example, taking the projection of the image will result in the character pattern " こ ゝ て ", which originally is composed of three characters, being segmented as a single character, as indicated by the frame 900 in FIG. 37. Accordingly, a rectangular area requiring further division from the rectangular area which has been segmented once must be judged from the height to width ratio, and character segmenting processing must be applied again to the rectangular area requiring further division.

Furthermore, in a case where the characters to undergo segmentation constitute a character string in which the widths of the characters differ greatly from one another, as is illustrated by the English text "HAWAII" in FIG. 38, segmentation based upon an average character width obviously is inappropriate. In addition, if a character string "AWA" in the character string "HAWAII" is segmented uniformly by lines perpendicular to the character string, part of the stroke of "W" will mix in with the character "A" alongside and a single character will not be obtained in correct fashion. In any case, this will lead to incorrect character recognition subsequently.

In a case where neighboring characters contact each other, as illustrated in FIG. 39, the two characters will not be separated correctly even if the boundary tracing method is employed.

In a case where erroneous character segmentation is performed, the estimated value of similarity will not be very large even for a character whose degree of similarity with a category obtained from the similarity computation is maximum, and the results of recognition will appear doubtful on the basis of experience. This represents erroneous recognition which arises because character recognition processing is executed without correcting the erroneous segmentation.

SUMMARY OF THE INVENTION

Accordingly, an object of the present invention is to provide a character recognition method in which character recognition can be executed at high speed.

According to the present invention, the foregoing object is attained by providing a character recognition method for performing character recognition by inputting an image original and segmenting a character image drawn in the image original, the method comprising an input step of inputting the image original, a segmentation step of executing segmentation of the character image from the image original by a first processor, a communication step of transmitting the character image segmented by the first processor to a second processor, and a character recognition step of executing character recognition, in parallel with the segmentation of the character image by the first processor, in the second processor based upon the character image transmitted by the communication step.

Another object of the present invention is to provide a character recognition apparatus in which character recognition can be executed inexpensively and at high speed.

According to the present invention, the foregoing object is attained by providing a character recognition apparatus for performing character recognition by inputting an image original and segmenting a character image drawn in the image original, the apparatus comprising input means for inputting the image original, segmentation means for executing segmentation of the character image from the image original by a first processor, a communication buffer for delivering the character image segmented by the first processor to a second processor, and character recognition means for executing character recognition, in parallel with the segmentation of the character image by the first processor, in the second processor based upon the character image delivered by the communication buffer.

In accordance with the present invention as described above, the character image segmented by the first processor is delivered to the second processor by the communication buffer, whereupon the second processor executes character recognition in parallel with the segmentation of the character image by the first processor.

When the character image segmented by the first processor is delivered to the second processor by the communication buffer without requiring a special processor for communication, the second processor is capable of executing character recognition in parallel with the segmentation of the character image performed by the first processor. Accordingly, the invention is particularly advantageous since low-cost, high-speed character recognition is possible.

Another object of the present invention is to provide a character recognition method in which characters are recognized by segmenting characters one at a time with greater precision.

According to the present invention, the foregoing object is attained by providing a character recognition method for inputting an image original in which a plurality of characters are written, isolating the plurality of characters, which are written in the image original, one character at a time and recognizing the characters, the method comprising an input step of reading the plurality of characters written in the image original and inputting the read characters as image information, a first segmentation step of isolating the plurality of characters from the image information one character at a time and recognizing these characters, an evaluation step of evaluating recognition probability of the characters segmented by the first segmentation step, and a second segmentation step of subjecting a character evaluated by the evaluation step to have a low recognition probability to character isolation and segmentation again.

Another object of the present invention is to provide a character recognition apparatus in which characters are recognized by segmenting characters one at a time with greater precision.

According to the present invention, the foregoing object is attained by providing a character recognition apparatus for inputting an image original in which a plurality of characters are written, isolating the plurality of characters, which are written in the image original, one character at a time and recognizing the characters, the apparatus comprising input means for reading the plurality of characters written in the image original and inputting the read characters as image information, first segmentation means for isolating the plurality of characters from the image information one character at a time and recognizing these characters, evaluation means for evaluating recognition probability of the characters segmented by the first segmentation means, and second segmentation means for subjecting a character evaluated by the evaluation means to have a low recognition probability to character isolation and segmentation again.

In accordance with the present invention as described above, a character which does not obtain a satisfactory recognition probability as a result of the segmentation performed by the first segmentation means is subjected to character isolation and segmentation again by the second segmentation means.

Thus, since a character which does not obtain a satisfactory recognition probability as a result of the segmentation performed solely by the first segmentation means is subjected to character isolation and segmentation again by the second segmentation means, the accuracy of character segmentation is improved and misrecognition is reduced. Accordingly, the invention is particularly advantageous since the time needed for corrections of misrecognition is reduced and text input time is shortened.

Still another object of the present invention is to provide a character recognition method in which errors in character segmentation can be corrected.

According to the present invention, the foregoing object is attained by providing a character recognition method for inputting an image original and recognizing characters written in the image original, the method comprising an input step of inputting the image original, a segmentation step of isolating and segmenting the characters, which are written in the image original inputted by the input step, one character at a time, a recognition step of performing character recognition by extracting features of a character segmented by the segmentation step, comparing these features with information that has been stored in a prescribed character dictionary and obtaining degree of similarity, and a control step of evaluating results of the character recognition performed by the recognition step, making the isolation of the character different from that previously based upon the evaluation, returning to the segmentation step and performing segmentation again.

A further object of the present invention is to provide a character recognition apparatus in which errors in character segmentation can be corrected.

According to the present invention, the foregoing object is attained by providing a character recognition apparatus for inputting an image original and recognizing characters written in the image original, the apparatus comprising input means for inputting the image original, segmentation means for isolating and segmenting the characters, which are written in the image original inputted by the input means, one character at a time, recognition means for performing character recognition by extracting features of a character segmented by the segmentation means, comparing these features with information that has been stored in a prescribed character dictionary and obtaining degree of similarity, and control means for evaluating results of the character recognition performed by the recognition means, making the isolation of the character different from that previously based upon the evaluation, and performing segmentation again.

In accordance with the present invention as described above, after recognition of a character segmented from the input image has been performed, the results of this character recognition are evaluated and control is executed in such a manner that character segmentation is performed again upon making character isolation different from that performed previously.

Thus, after character recognition has been applied to a segmented character, the results of character recognition are evaluated and segmentation is performed again on a trial basis. As a result, misrecognition arising from character segmentation can be reduced. Owing to the fewer instances of misrecognition, the labor involved in correcting for misrecognition can be reduced and the time needed for inputting text can be shortened.

A further object of the present invention is to provide a character recognition method in which accurate character recognition is capable of being performed even if characters written in a character image adjoin or contact each other or even if characters of different character widths (heights) are mixed together.

According to the present invention, the foregoing object is attained by providing a character recognition method for inputting an image original and recognizing characters written in the image original, the method comprising an input step of inputting the image original, a first segmentation step of segmenting a character image written in the image original inputted by the input step, an evaluation step of evaluating the character image segmented by the first segmentation step and determining whether further segmentation is possible, a partitioning-point decision step of obtaining, based upon the determination made by the evaluation step, a partitioning point for performing further segmentation, and a second segmentation step of further segmenting the segmented character image using the partitioning point, which has been obtained by the partitioning-point decision step, as a starting point.

Still another object of the present invention is to provide a character recognition apparatus in which accurate character recognition is capable of being performed even if characters written in a character image adjoin or contact each other or even if characters of different character widths (heights) are mixed together.

According to the present invention, the foregoing object is attained by providing a character recognition apparatus for inputting an image original and recognizing characters written in the image original, the apparatus comprising input means for inputting the image original, first segmentation means for segmenting a character image written in the image original inputted by the input means, evaluation means for evaluating the character image segmented by the first segmentation means and determining whether further segmentation is possible, partitioning-point decision means for obtaining, based upon the determination made by the evaluation means, a partitioning point for performing further segmentation, and second segmentation means for further segmenting the segmented character image using the partitioning point, which has been obtained by the partitioning-point decision means, as a starting point.

In accordance with the present invention as described above, a partitioning point for further segmentation is obtained and segmentation is executed using this point as the starting point if the segmentation of the character image by the first segmentation is unsatisfactory.

Thus, the results of segmentation of the character image by the first segmentation are evaluated, and segmentation from a partitioning point is retried with regard to a segmented character image having an unsatisfactory evaluation. This makes possible more detailed segmentation of the character image. Therefore, even if characters are close to or in contact with each other, or even if an input character image includes a mixture of characters having different character widths (heights), the accuracy of character segmentation is improved and more accurate character recognition can be executed. This invention is particularly advantageous since subsequent correction work can be reduced and total text input time shortened.

A further object of the present invention is to provide a character recognition method in which accurate character recognition is capable of being performed even if characters written in a character image adjoin or contact each other or even if characters of different character widths (heights) are mixed together.

According to the present invention, the foregoing object is attained by providing a character recognition method for inputting an image original and recognizing characters written in the image original, the method comprising an input step of inputting the image original, a first segmentation step of segmenting a character image written in the image original inputted by the input step, an evaluation step of evaluating the character image segmented by the first segmentation step and determining whether further segmentation is possible, a second segmentation step of performing several segmentations from the segmented character image based upon the determination made by the evaluation step, a character recognition step of performing character recognition based upon a character image segmented by the first and second segmentation steps, and a selection step of evaluating results of character recognition performed by the character recognition step, and selecting, as a final segmented character image, a segmented character image having the highest evaluation among the several segmented character images segmented by the second segmentation step.

Yet another object of the present invention is to provide a character recognition apparatus in which accurate character recognition is capable of being performed even if characters written in a character image adjoin or contact each other or even if characters of different character widths (heights) are mixed together.

According to the present invention, the foregoing object is attained by providing a character recognition apparatus for inputting an image original and recognizing characters written in the image original, the apparatus comprising input means for inputting the image original, first segmentation means for segmenting a character image written in the image original inputted by the input means, evaluation means for evaluating the character image segmented by the first segmentation means and determining whether further segmentation is possible, second segmentation means for performing several segmentations from the segmented character image based upon the determination made by the evaluation means, character recognition means for performing character recognition based upon a character image segmented by the first and second segmentation means, and selection means for evaluating results of character recognition performed by the character recognition means, and selecting, as a final segmented character image, a segmented character image having the highest evaluation among the several segmented character images segmented by the second segmentation means.

In accordance with the present invention as described above, the possibility of further segmentation is determined and several segmentations are executed if the segmentation of the character image by the first segmentation is unsatisfactory. Character recognition is then executed based upon the several segmentations and the result of segmentation having the highest evaluation among the results of character recognition is selected as the final segmented character image.

Thus, the results of segmentation of the character image by the first segmentation are evaluated, several segmentations are executed with regard to a segmented character image having an unsatisfactory evaluation, the result of character recognition is reevaluated after the execution of character recognition in accordance with these segmentations, and a final segmented character image is decided. Therefore, even if characters are close to or in contact With each other, or even if an input character image includes a mixture of characters having different character widths (heights), the accuracy of character recognition is improved. This invention is particularly advantageous since the total of the labor involved in inputting text, inclusive of labor for correcting misrecognition, can be reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 20A, 20B, 20C, 20D and 20E are diagrams for describing character segmentation;

FIGS. 24A, 24B, 24C and 24D are diagrams showing an example of input character images which undergo character segmentation in accordance with the sixth embodiment;

FIGS. 25A, 25B, 26A and 26B are flowcharts showing the details of second segmentation processing according to the sixth embodiment;

FIGS. 37, 38 and 39 are diagrams showing examples of input character patterns that can cause erroneous recognition.

DESCRIPTION OF THE PREFERRED EMBODIMENTS

Preferred embodiments of the present invention will now be described in detail in accordance with the accompanying drawings.

Described below are several embodiments of character recognition apparatus which eliminate erroneous recognition by solving the problems pointed out in the prior art, and which execute character recognition processing inexpensively and at high speed.

[First Embodiment (FIGS. 1–8)]

Figure 1:
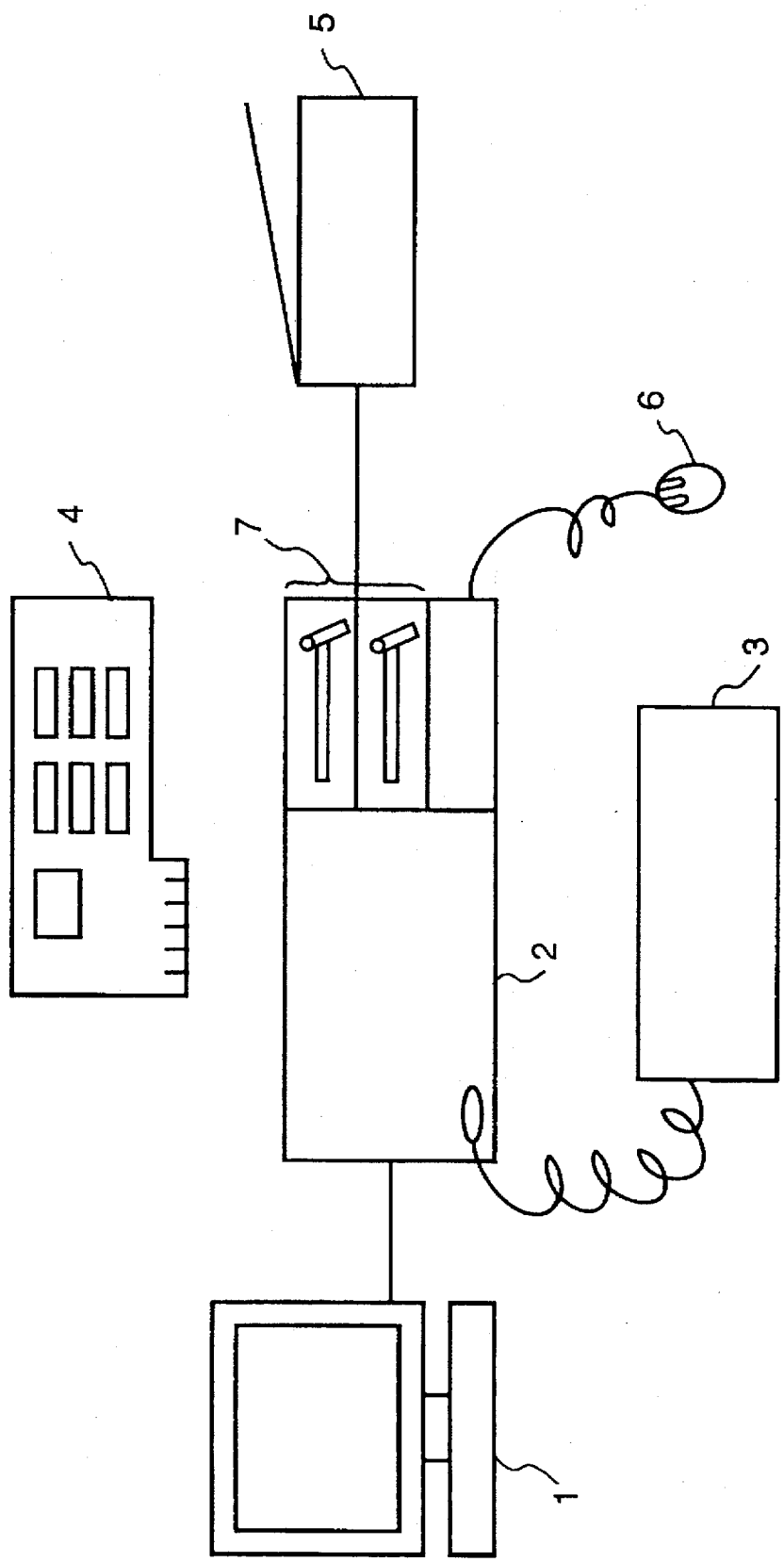
FIG. 1 is a diagram illustrating the construction of a character recognition apparatus used in a first embodiment of the present invention.

FIG. 1 is a diagram showing the external appearance of a character recognition apparatus in accordance with the first embodiment. As shown in FIG. 1, the apparatus includes a CRT 1 for displaying the results of character recognition as well as various messages relating to character recognition processing, a main unit 2 in which there is installed a CPU board for performing processing such as character segmentation from an inputted image original, a keyboard (KB) 3 for inputting various instructions and the like concerning character recognition processing, a character recognition board 4 on which circuitry for executing character recognition with regard to a segmented character is mounted, a scanner 5 for reading in an image original in which characters are written, a pointing device 6 which, like the keyboard 3, is for inputting various instructions and the like relating to character recognition processing, and a floppy disk driver (FDD) 7. The character recognition board 4 is used by being installed in the main unit 2.

The characterized feature of the present apparatus resides in the fact that the CPU board for executing such processing as character segmentation from the image original is installed in the main unit 2 together with the character recognition board 4, these are interconnected via a high-speed CPU bus (not shown), and character recognition processing is executed while the two boards cooperate with each other.

Figure 2:
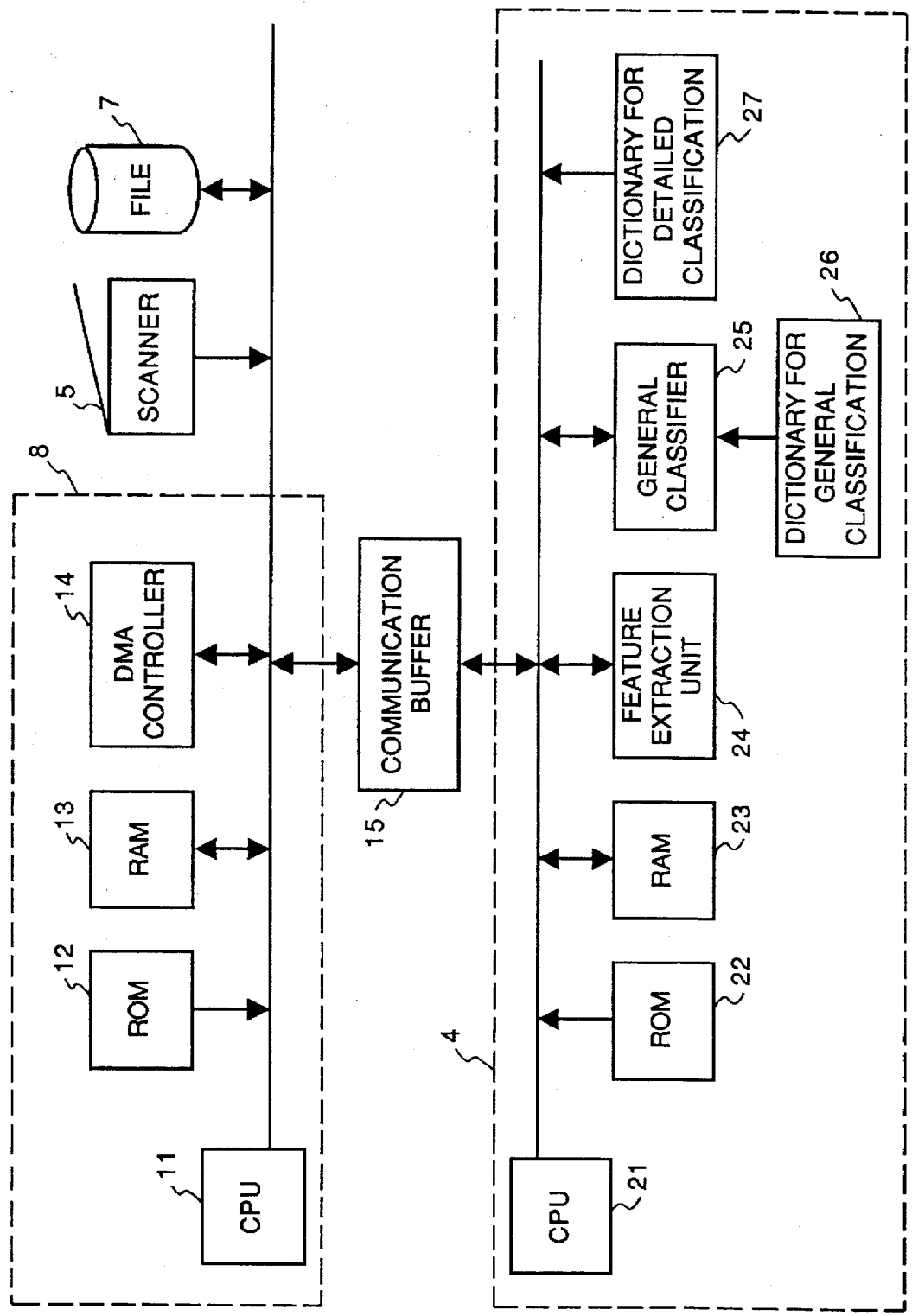
FIG. 2 is a block diagram showing the detailed construction of both a CPU board and character recognition board incorporated in the apparatus shown in FIG. 1.

FIG. 2 is a block diagram showing the detailed construction of both the CPU board installed in the main unit 2 and the character recognition board 4. In FIG. 2, numeral 8 denotes a CPU board which includes a CPU 11 for performing processing and control other than that for character recognition in the character recognition apparatus, a ROM (read-only memory) 12 for storing programs executed by the CPU 11, a RAM (random-access memory) 13 for storing text images and the like processed by the character recognition apparatus, and a DMA controller 14 for controlling data transfer from a scanner 5 or an auxiliary storage unit such as the floppy disk drive (FDD) in order that the data may be processed in the CPU 11. Numeral 15 denotes a communication buffer which buffers data transmitted to and received from the character recognition board 4.

The character recognition board 4 includes a special-purpose character recognition CPU 21 for controlling overall identification computation and recognition processing, a ROM 22 in which the character recognition program is stored, a RAM 23 used as a working area for character recognition processing executed by the CPU 21, a feature extraction unit 24 for extracting feature quantities from a character image stored in the communication buffer 15, a general classifier 25 for narrowing down candidate characters by performing distance computation between a feature vector given by the CPU 21 and previously learned data, a dictionary for general classification 26 which stores previously learned data, and a dictionary for detailed classification 27 which stores learned data for more detailed distance computation with regard to candidate characters obtained by the general classifier 25.

In the arrangement described above, the CPU 11 and special-purpose character recognition CPU 21 communicate by generating interrupts in each other. The CPU 11 generates a pattern-recognition-request interrupt in the CPU 21, and the CPU 21 generates an identification-completion interrupt as well as an image-data-transfer request interrupt in the CPU 11.

Figure 3:
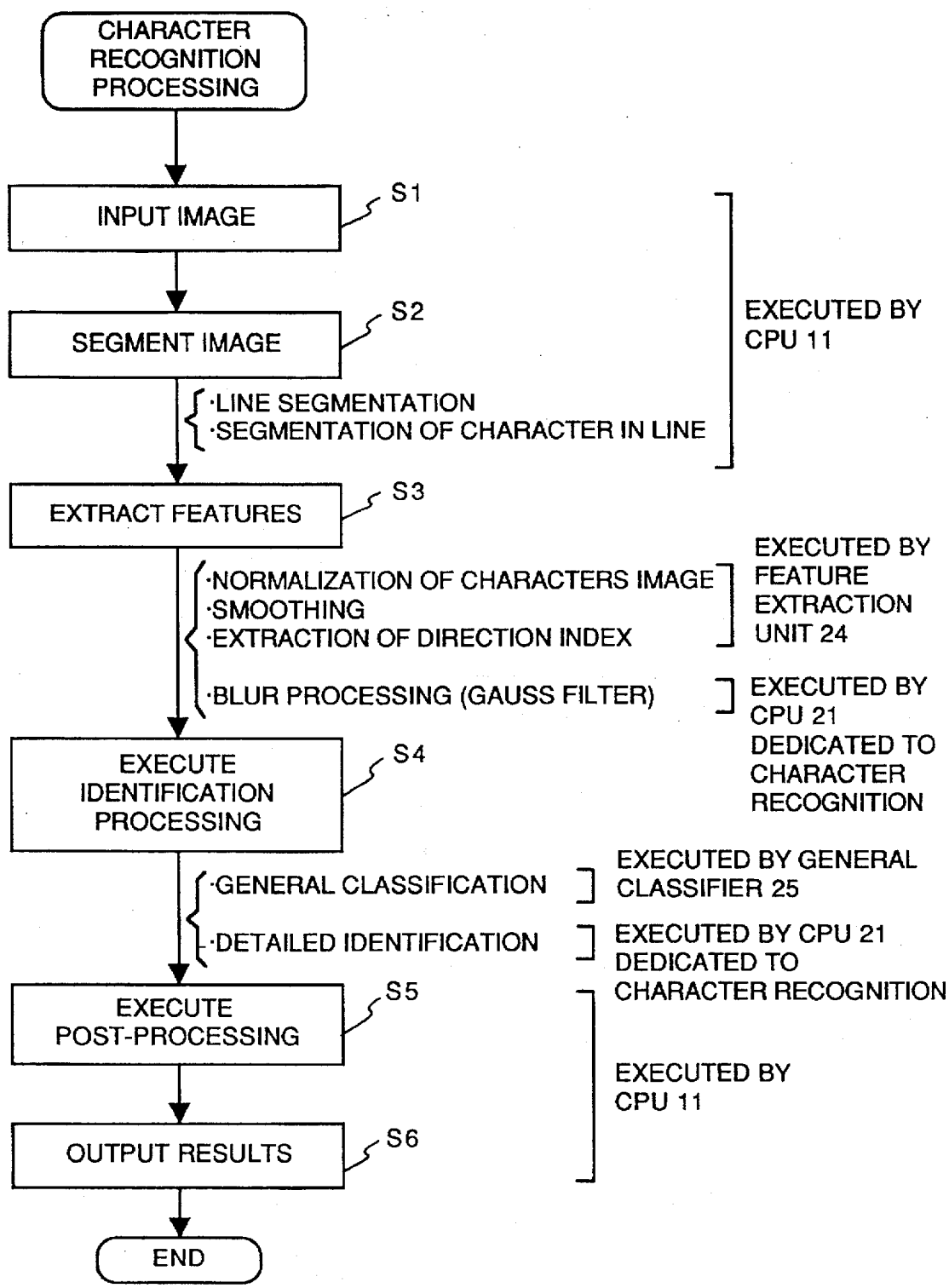
FIG. 3 is a flowchart showing the general features of character recognition processing in accordance with the first embodiment.

FIG. 3 is a general flowchart showing the general features of character recognition processing executed by the character recognition apparatus according to the present embodiment. In accordance with the flowchart of FIG. 3, the CPU 11 inputs an image at step S1 and executes character segmentation processing at step S2. Next, at step S3, processing for feature extraction is executed by the feature extraction unit 24 and special-purpose character recognition CPU 21 based upon data sent via the communication buffer 15. This is followed by step S4, at which identification processing is executed by the general classifier 25 and special-purpose character recognition CPU 21. Thereafter, the data which is the result of character recognition is sent to the CPU board 8 via the communication buffer 15, and the CPU 11 executes post-processing and processing for outputting results at steps S5 and S6, respectively.

Next, the processing executed by the CPU 11 and the CPU 21 will be described with reference to the flowcharts shown in FIGS. 4–6 and the time chart of processing shown in FIG. 7. In order to simplify the description, it will be assumed that a plurality of lines (n lines) of characters hand-written in a single document are inputted as a text image.

Figure 4:
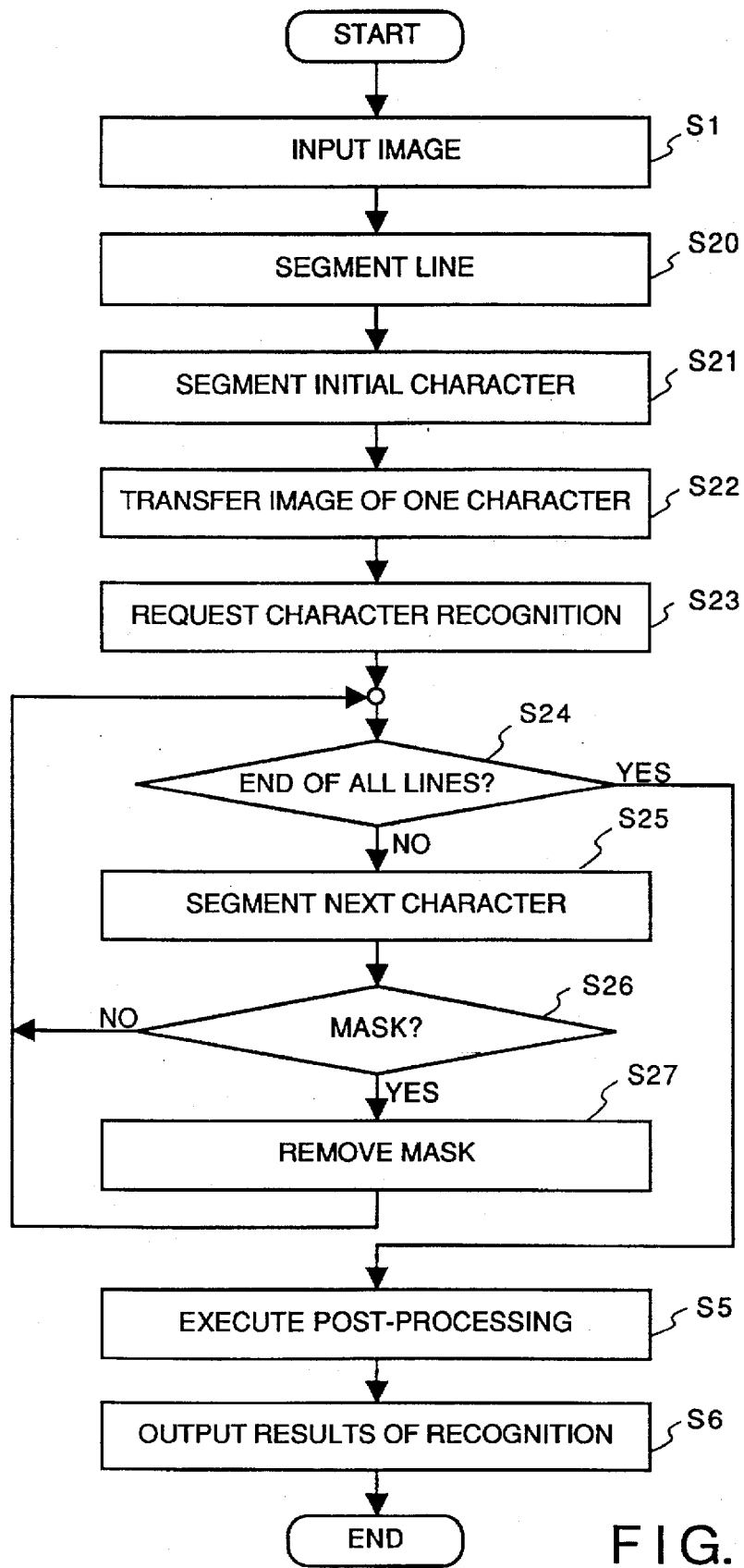
FIG. 4 is a flowchart showing character recognition processing executed on the side of the CPU board.
Figure 5:
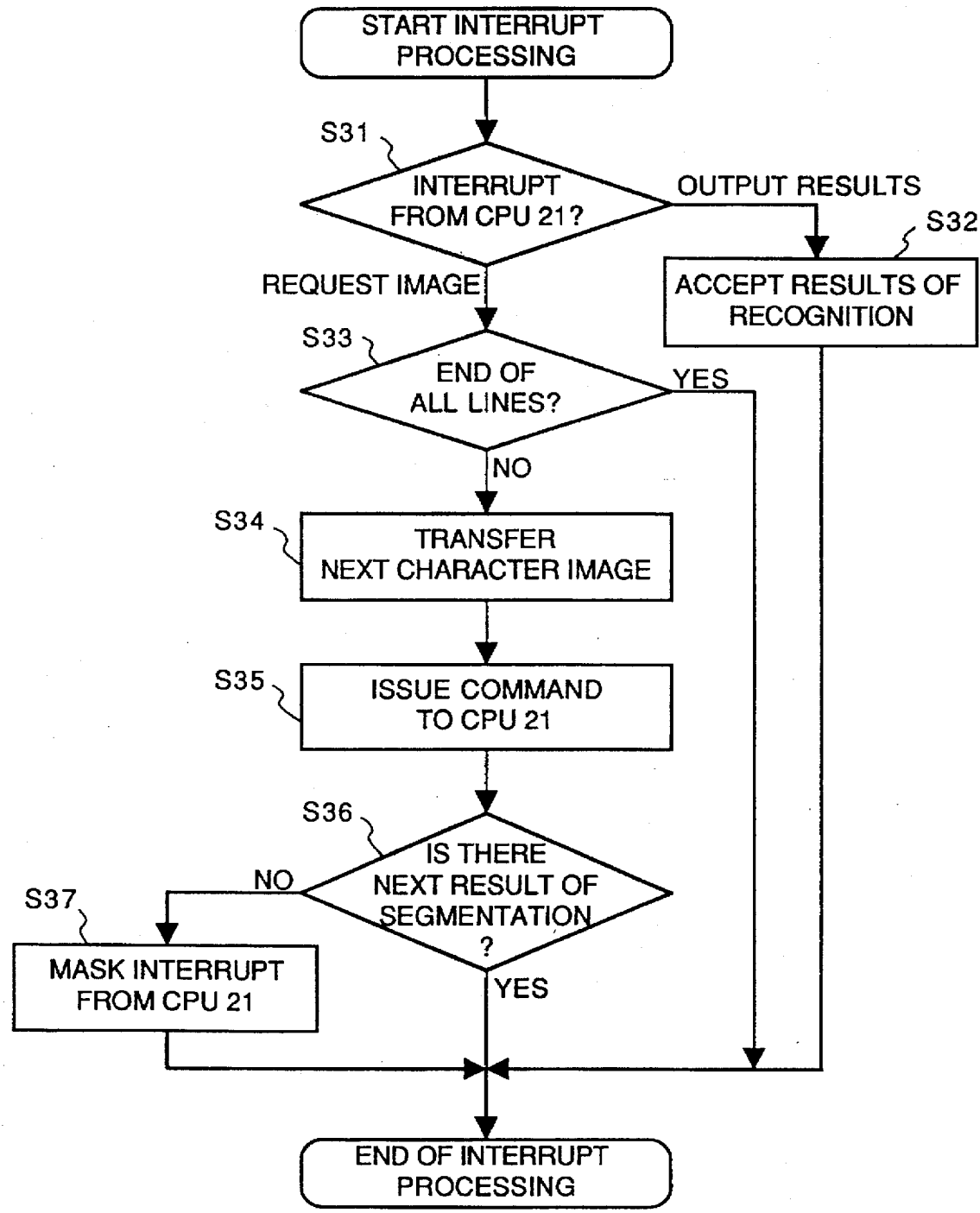
FIG. 5 is a flowchart showing interrupt processing of the a CPU 11 on the side of the CPU board.

(1) Processing executed by CPU 11 (FIGS. 4 and 5)

FIG. 4 is a flowchart showing the principal processing executed by the CPU 11, and FIG. 5 is a flowchart showing interrupt processing. Steps in the flowchart of FIG. 4 identical with those described in FIG. 3 are designated by like step numbers.

At step S1 in FIG. 4, a text image to undergo character recognition is read in from the auxiliary storage unit such as the scanner 5 or floppy-disk drive (FDD) 7 via the DMA controller 4 and is transferred to the RAM 13.

This is followed by step S20, at which the CPU 11 subjects the image stored in RAM 13 to line segmentation, and then by step S21, at which the CPU 11 performs segmentation of a first character from the first segmented line. The timing of this operation corresponds to $t=t_{11}$ in the time chart shown in FIG. 7.

When segmentation of the first character of the first line ends, processing proceeds to step S22, at which the character image of the first character of the segmented first line is transferred to the communication buffer 15, and then to step S23, at which the CPU 11 issues a pattern-recognition request instruction to the CPU 21. The timing of this operation corresponds to $t=T_{11}$ in the time chart shown in FIG. 7. After issuance of this instruction, the CPU 21 generates an interrupt in the CPU 11 asynchronously with respect to the processing executed by the CPU 11.

Next, it is examined at step S24 whether character segmentation has ended for all lines. If it is determined here that character segmentation has ended for all lines, processing proceeds to step S5. The timing of this operation corresponds to $t=t_{nm}$ in the time chart shown in FIG. 7. Post-processing is executed at step S5, and the results of recognition are displayed on the CRT 1 at step S6. If it is determined at step S24 that character segmentation has not ended for all lines, then processing proceeds to step S25, at which segmentation of the next character is performed. The data indicative of the results of this character segmentation is stored in the RAM 13.

Next, it is examined at step S26 whether a "mask" has been applied in such a manner that a response will not be made to the interrupt from the CPU 21. In a case where the mask has been applied, character segmentation processing will not be completed even if a segmented-image data-transfer request is issued by the CPU 21. There will be no character image that can be transferred, and the transfer request signal will be ignored. If the mask has been applied, processing proceeds to step S27, at which the mask is removed, and processing then returns to step S24. If the mask has not been applied, then processing returns directly to step S24.

Interrupt processing will now be described.

The interrupt processing is generated asynchronously with respect to the above-described processing executed by the CPU 11 after the character image of the first character of the first line is transferred to the character recognition board on the side of CPU 21. This interrupt processing is generated in the CPU 11 taking as an opportunity the image-data transfer-request instruction or a character-recognition completion notice from the CPU 21.

When the interrupt is generated, it is examined at step S31 (FIG. 5) whether the interrupt issued by the CPU 21 is the image-data transfer-request instruction or the character-recognition completion notice. An interrupt of this kind is generated at $t=t_{int1}$, $t=t_{int2}$ or $t=t_{int3}$, etc., in the time chart of FIG. 7.

If the interrupt is the character-recognition completion notice, then processing proceeds to step S32, at which the results of recognition are accepted from the character recognition board 4 via the communication buffer 15. The interrupt is then canceled. If the interrupt is the image-data transfer-request instruction, on the other hand, processing proceeds to step S33.

It is examined at step S33 whether the character segmentation executed by the CPU 11 has already ended for all lines and whether transfer of the character image has been completed. If it is determined that character segmentation and transfer of the character image have been completed, then an instruction to this effect is ignored and interrupt processing is terminated. The timing of this operation corresponds to time $t=t_{intn}$ in accordance with the time chart shown in FIG. 7. If it is determined that character segmentation and transfer of the character image have not been completed, then processing proceeds to step S34.

At step S34, the character image of the next segmented character stored in the RAM 13 is transferred to the communication buffer 15. This is followed by step S35, at which the pattern-recognition request instruction is issued to the CPU 21. The timing of this operation corresponds to $t=T_{12}$ or $t=T_{13}$ etc., for example, in the time chart of FIG. 7.

Next, at step S36, it is examined whether the next segmented character image for transfer has been stored in the RAM 13. If it is determined that this character image has been stored in the RAM 13, then interrupt processing is terminated. On the other hand, if it is determined that the next segmented character image for transfer has not yet been stored in the RAM 13, then processing proceeds to step S37. At this step, the image-data transfer-request instruction from the CPU 21 is judged to be fast in comparison with the speed of character segmentation processing executed by the CPU 11, an interrupt is received from the CPU 21, a mask is applied in such a manner that the image-data transfer-request instruction will not be accepted, and interrupt processing is then terminated.

In the case of this embodiment, it is assumed that the CPU 11 ignores and does not respond to an image-data transfer-request instruction that follows the application of the mask. As a result, the transfer of the segmented character image is performed by a response to an interrupt which follows the removal of the mask, and therefore an adjustment is made so as to balance the character segmentation processing speed and the character recognition speed.

Figure 6:
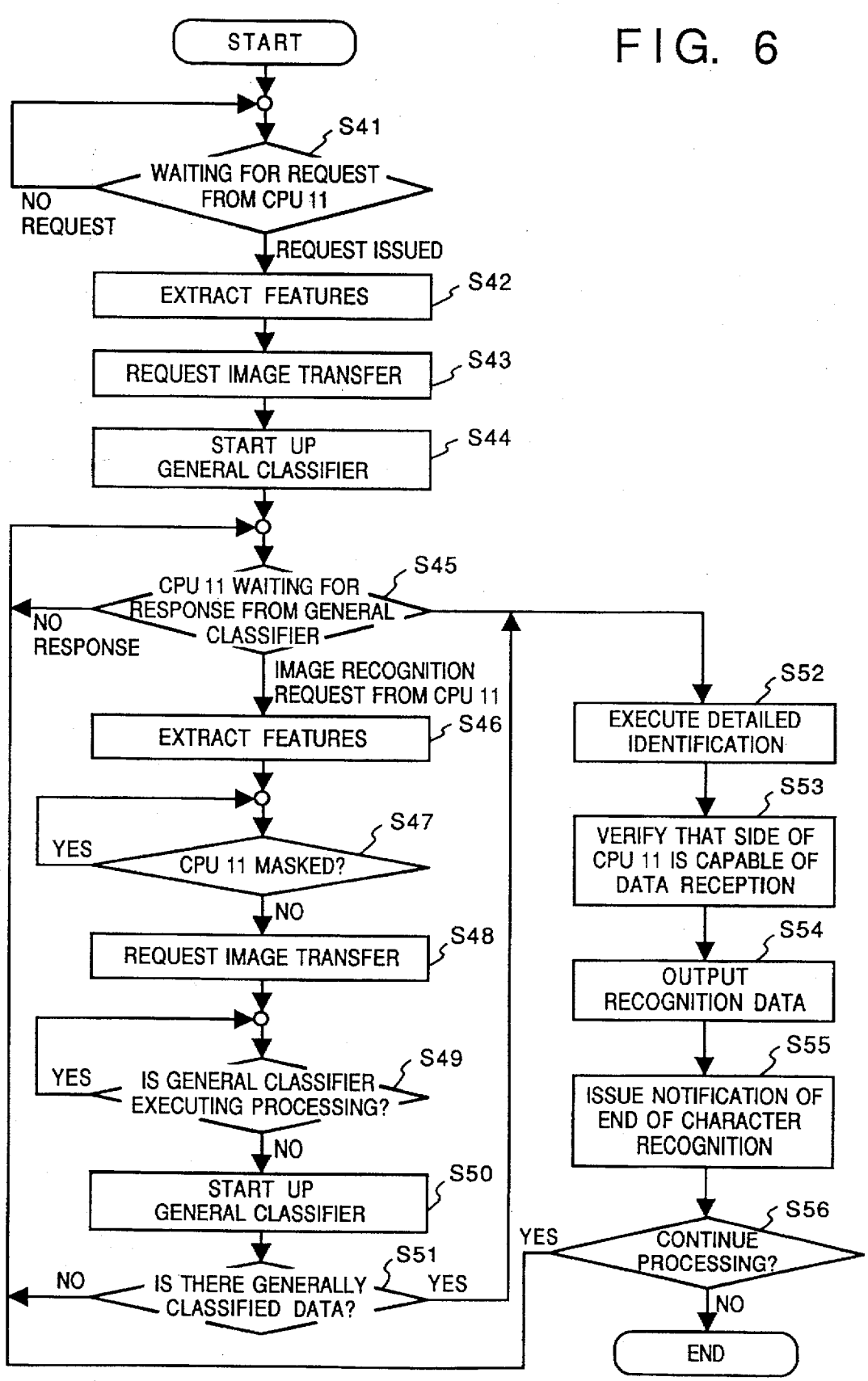
FIG. 6 is a flowchart showing character recognition processing by a CPU 21 on the side of the character recognition board.
Figure 7A:
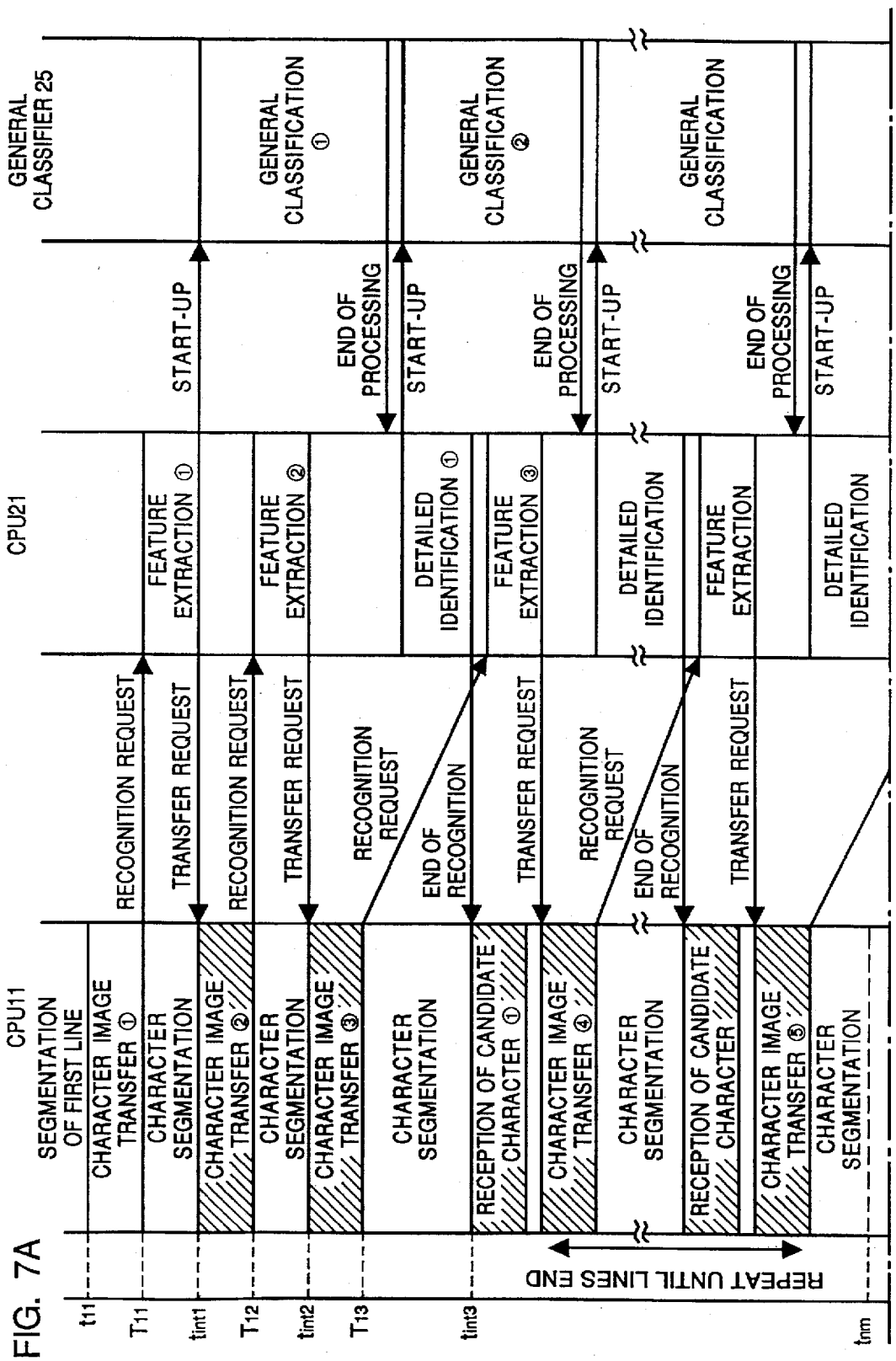
FIGS. 7A and 7B are processing time charts for a case where character recognition is executed by transferring a segmented character image to the character recognition board one character at a time.
Figure 7B:
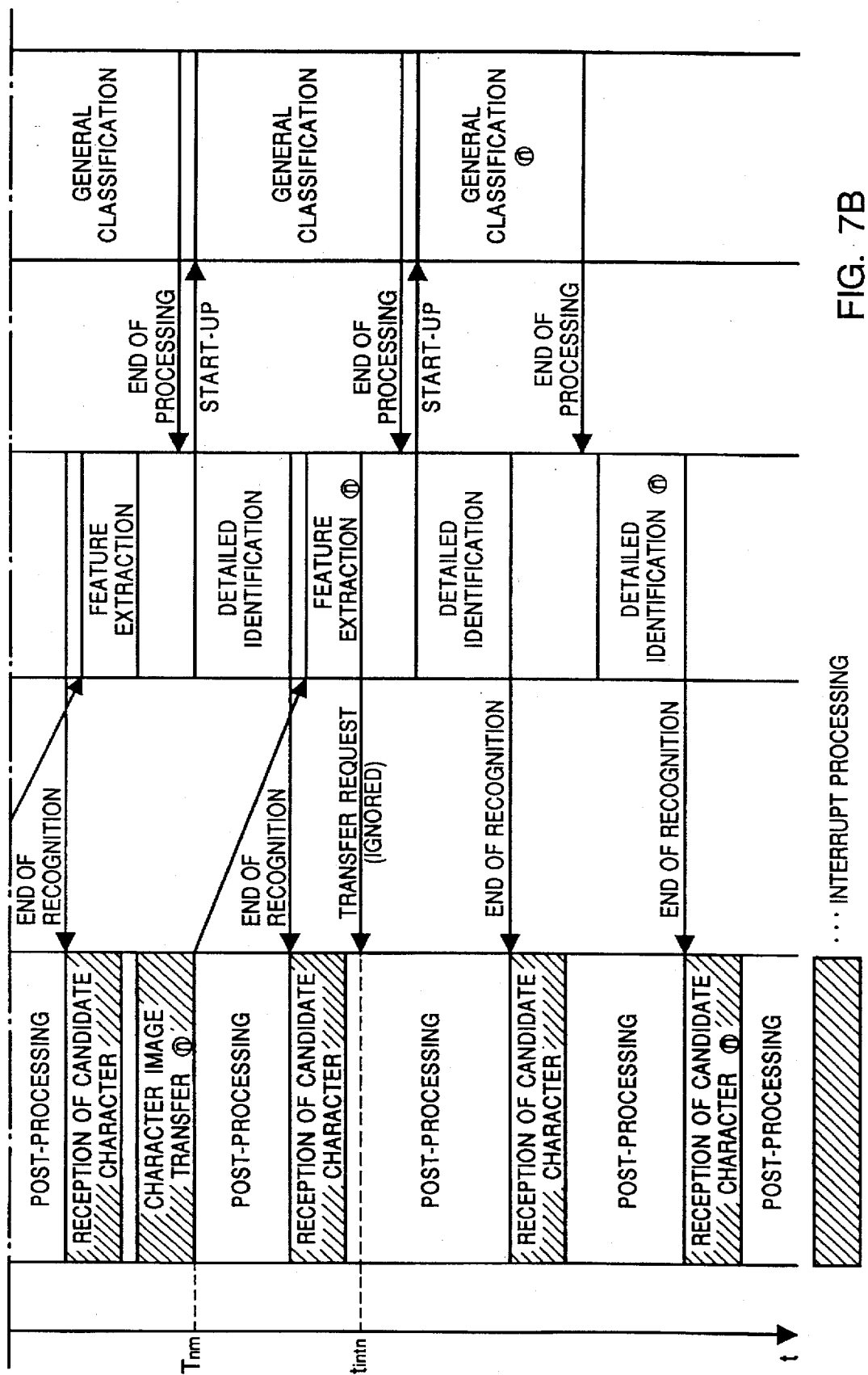

(2) Processing executed by CPU 21 (FIG. 6)

The processing executed by CPU 21 mounted on the character recognition board 4 will now be described with reference to the flowchart shown in FIG. 6.

The processing executed by the character recognition board 4 is started by the pattern-recognition request instruction from the CPU 11. In other words, at step S41 processing initially is in a state awaiting the recognition request instruction from the CPU 11 and proceeds to step S42 at the moment this request instruction is received. At step S42, the segmented character image transferred to the communication buffer 15 by the CPU 11 is received, the features of this character image are extracted using the feature extraction unit 24, and the obtained information is stored in the RAM 23 as a feature vector.

A plurality of buffers (two or more) for storing feature vectors are available in the RAM 23, and the design is such that a data inconsistency will not occur when there is a conflict between access from the CPU 21 and access from the general classifier 25. Each buffer is provided with a flag [IFLGi, i=1, N (N≧2)]. Depending upon the value of the flag, it can be determined whether general classification processing based upon the feature vector stored in the buffer has been completed, whether the processing is in progress or whether the processing has not yet been executed. When a new feature vector has been stored in the buffer, the value of the flag is set by the CPU 21. When the general classification processing by the general classifier 25 has started or ended, the value of the flag is rewritten by the general classifier 25.

When feature extraction ends, the processing proceeds to step S43, at which an interrupt is generated in the CPU 11 and an image-data transfer-request instruction is issued in order to request the next character image. At the same time, the general classifier 25 is instructed at step S44 to perform matching between the obtained feature vector and the data stored in the dictionary for general classification 26.

Thereafter, the CPU 21 waits at step S45 for the pattern-recognition request instruction from the CPU 11 and a notification of completion of general classification processing from the general classifier 25. If the notification of completion of general classification processing is received, then processing proceeds to step S52, at which a final candidate character is determined by executing detailed identification processing with regard to candidate characters (which may be one or two or more in number) for which there is a possibility of being the result of character recognition extracted by the general classification processing. Next, processing proceeds to step S53, at which it is confirmed that the immediately preceding interrupt processing operation on the side of CPU 11 has ended. Next, at step S54, the result of character recognition is outputted to the communication buffer 15, and then an interrupt is generated in the CPU 11 and the character-recognition completion notice is issued at step S55. Thereafter, the processing proceeds to step S56, where it is examined whether there is an instruction in waiting. If it is determined that there is an instruction in waiting, then processing returns to step S45; otherwise, processing is terminated. In the actual operation of the apparatus, the system prepares for the next character recognition operation and the state awaiting an instruction at step S41 is attained even if there is no instruction in waiting, so long as the power supply is not turned off.

If the pattern-recognition request instruction is received at step S45, then processing proceeds to step S46, at which feature extraction is executed with regard to the segmented character image transferred from the CPU 11, just as at step S42. An interrupt is then generated in the CPU 11 at step S47 and the CPU 11 examines whether a mask has been applied. If the CPU 11 confirms that the mask has been applied, processing waits until the mask has been removed. If the CPU 11 confirms that the mask has not been applied, on the other hand, processing proceeds directly to step S48 and the image-data transfer-request instruction is issued in order to request the next character image.

Next, at step S49, the flag in the buffer of RAM 23 which stores the feature vector is investigated and it is examined whether the general classifier 25 is executing processing. If it is determined that processing is in progress, then the completion of general classification processing is awaited. When this has been completed, processing proceeds to step S50, at which general classification processing base upon a new feature vector is requested of the general classifier 25, as at step S44.

This is followed by step S51, at which it is examined, based upon the flag of the buffer in RAM 23 in which the feature vector is stored, whether there is data for which general classification processing has ended. If it is determined that there is data for which this processing has been completed, then processing proceeds to step S52; otherwise, processing returns to step S45.

Thus, in accordance with this embodiment, the CPU 11 and the CPU 21 independently execute character segmentation processing and character recognition processing asynchronously and in parallel fashion. As a result, character recognition can be executed efficiently and at high speed. Furthermore, since the data necessary for these two processing operations is transmitted and received by interrupts, a special-purpose processor for communication is not required. This makes it possible to reduce the overall cost of the apparatus.

In the processing set forth above, the segmented character images are transferred from the CPU 11 to the side of the character recognition board 4 in units of one character each. However, this does not impose a limitation upon the invention. For example, the segmented character images can be transferred in units of one line each. In such case, the processing operations executed by the CPU 11, CPU 21 and general classifier 25 are related in the manner illustrated in the time chart of FIG. 8.

Figure 8A:
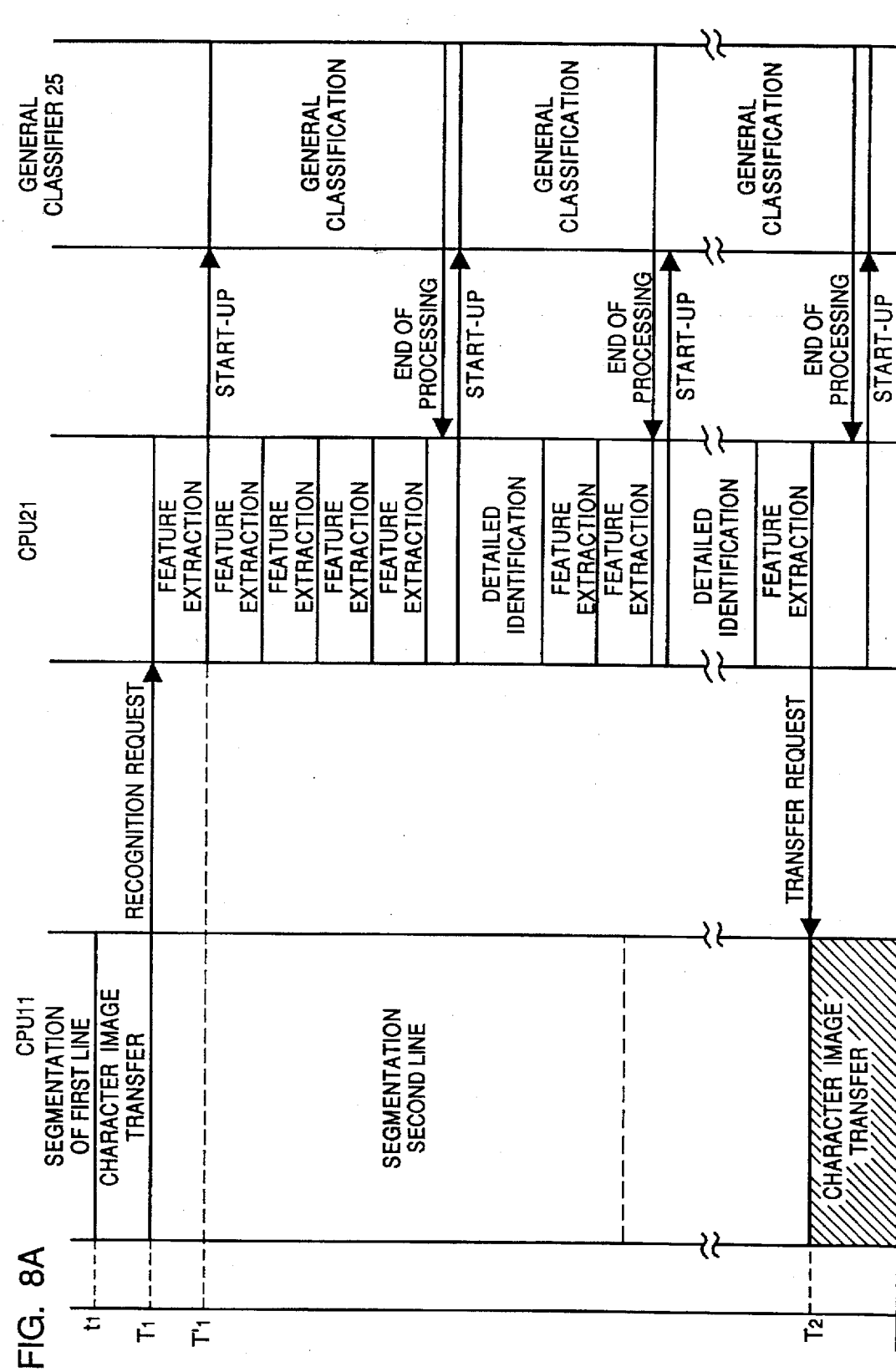
FIGS. 8A and 8B are processing time charts for a case where character recognition is executed by transferring a segmented character image to the character recognition board one line at a time.
Figure 8B:
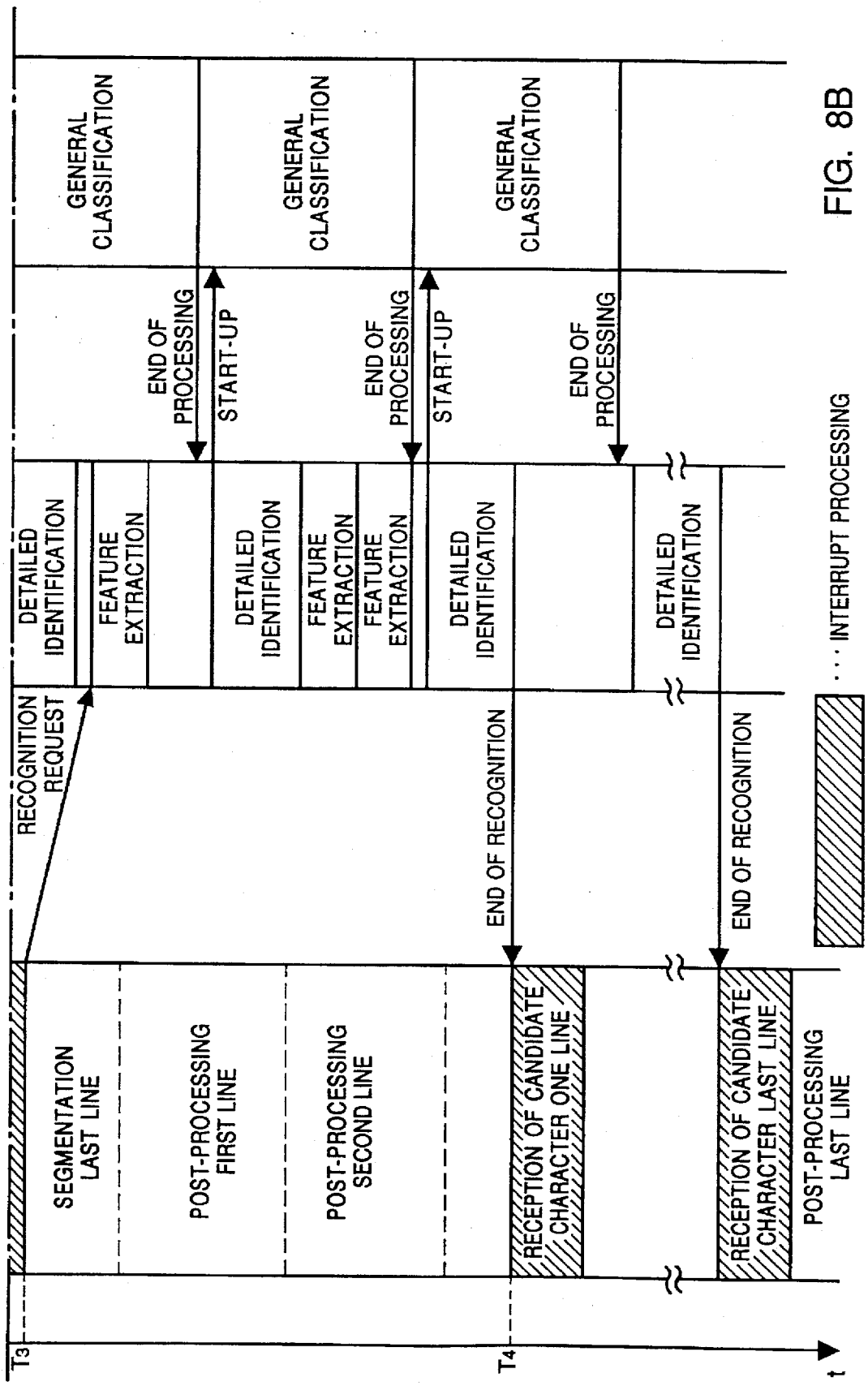

The processing shown in FIG. 8 is premised on the fact that the RAM 23 is furnished with a buffer which stores feature vectors corresponding to characters of at least one line.

On the premise of the foregoing, the CPU 11, following the completion of character segmentation of the first line at time $t=t_1$, transfers the first line of segmented character images to the communication buffer 15 at time $t=T_1$ and issues a pattern-recognition request instruction in accordance with the time chart shown in FIG. 8. The CPU 21 receives the character images and requests the general classifier 25 to perform general classification processing after feature extraction of the first character of the received image ends (time $t=T_1'$).

During the dead time up until the end of general classification processing, the CPU 21 executes feature extraction of the character images from the second character onward and stores the feature vectors in the vacant buffer of RAM 23. Thereafter, the CPU 21 executes character-image feature extraction, general classification and detailed identification, while searching the values of the flag (IFLGi) provided in the buffer of RAM 23, in such a manner that the processing waiting time of the CPU 21 is minimized, and while performing monitoring in such a manner that unnecessary blank space does not develop in the buffer of RAM 23. At the moment (time $t=T_2$) extraction of features of all character images of one line ends, an image-data transfer-request instruction is issued to the CPU 11. In response, the CPU 11 transfers the next one line of character images to the communication buffer 15 and simultaneously issues the pattern-recognition request instruction at time $t=T_3$. Until the pattern-recognition request instruction is received, general classification processing and detailed identification processing are executed by the character recognition board 4 using the unprocessed feature vectors left in the RAM 23.

When the CPU 21 receives the pattern-recognition request instruction, feature vectors are extracted successively one character at a time with regard to the next line of character images so as to minimize the processing waiting time of the CPU, and these vectors are stored in the buffer of the RAM 23. (For example, in order to make optimum use of the CPU resource, the CPU utilization time is assigned at a ratio of 2:1:1 with regard to feature extraction, general classification and detailed identification, respectively, until vacant buffer space in the RAM 23 is eliminated).

When character recognition of the first line ends as a virtue of the foregoing processing (time $t=T_4$), the result of one line of character recognition is outputted to the communication buffer 15, an interrupt is generated in the CPU 11 and the character-recognition completion notice is issued.

[Second Embodiment (FIGS. 9-13)]

Processing will now be described in which character segmentation is executed more accurately also with regard to character images of a variety of handwriting inputs. In this embodiment also, a character recognition apparatus having the construction described in connection with FIG. 1 can be used. However, a character recognition apparatus having a simpler construction of the kind shown in FIG. 9 shall be used in order to simplify the description of portions not central to character segmentation processing, which is the focus of the description.

Figure 9:
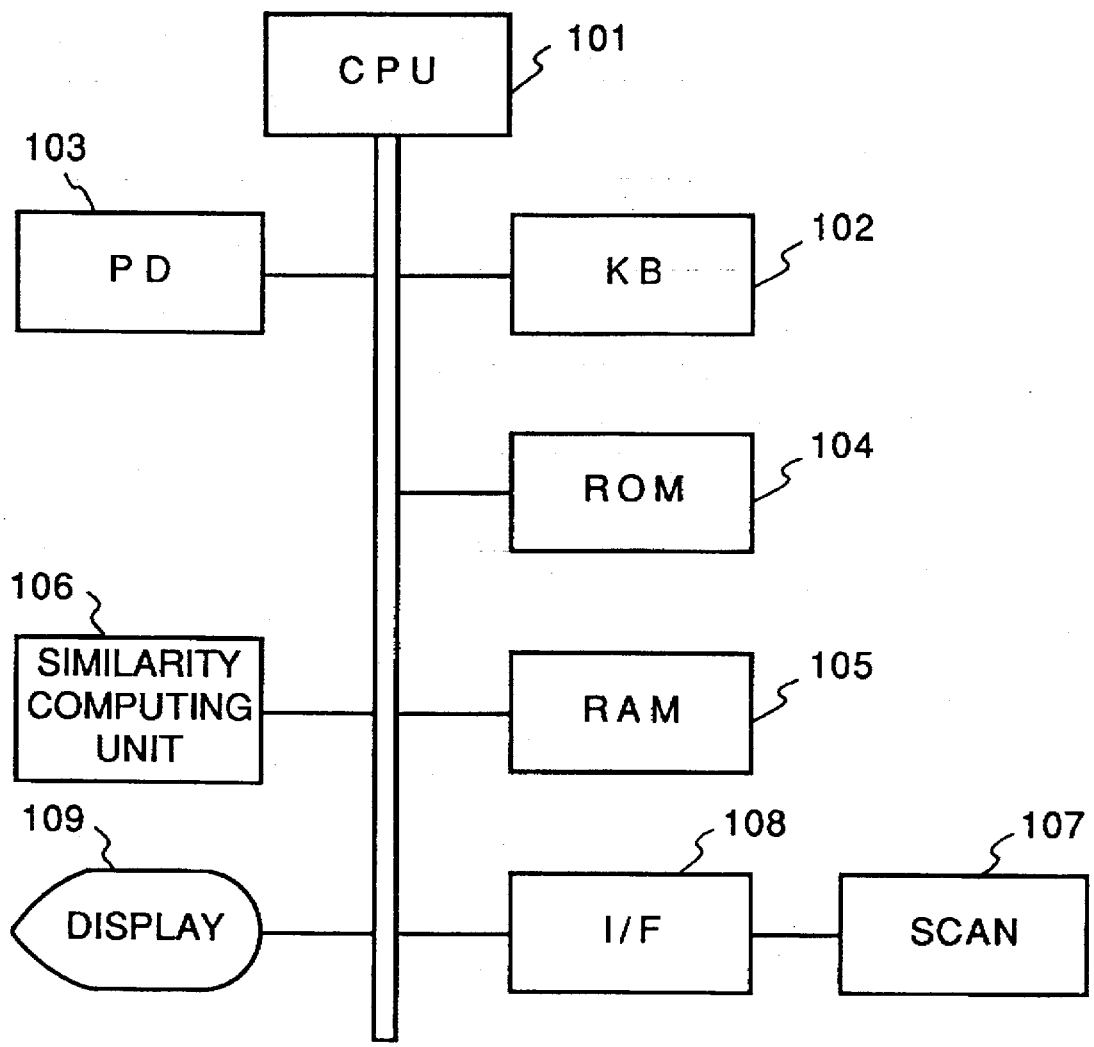
FIG. 9 is a block diagram illustrating the construction of a character recognition apparatus in accordance with a second embodiment of the present invention.

FIG. 9 is a block diagram showing the construction of the character recognition apparatus representing a typical embodiment of the present invention. As shown in FIG. 9, the apparatus includes a CPU 101 for inputting an image, executing processing such as segmentation of a character image and controlling the overall apparatus, a keyboard (KB) 102 for inputting characters and making revisions, a pointing device (PD) 103 such as a mouse, a ROM 104 for storing programs executed by the CPU 101, a RAM 105 for storing character images, results of character segmentation and results of recognition, a similarity computing unit 106 for computing similarity with each character concerning segmented character images, an image scanner (SCAN) 107 for reading images, an interface (I/F) 108 of the image scanner, and a display 109 for displaying results of character recognition.

Processing for segmenting a character image executed by the character recognition apparatus constructed as set forth above will now be described with reference to the flowcharts shown in FIGS. 10–12. An example will be considered in which recognition is applied to laterally written text, such as a Japanese sentence, in which a circumscribed rectangle of a character image of each character constituting the sentence approximates a square and the character pitch is fixed.

Figure 10:
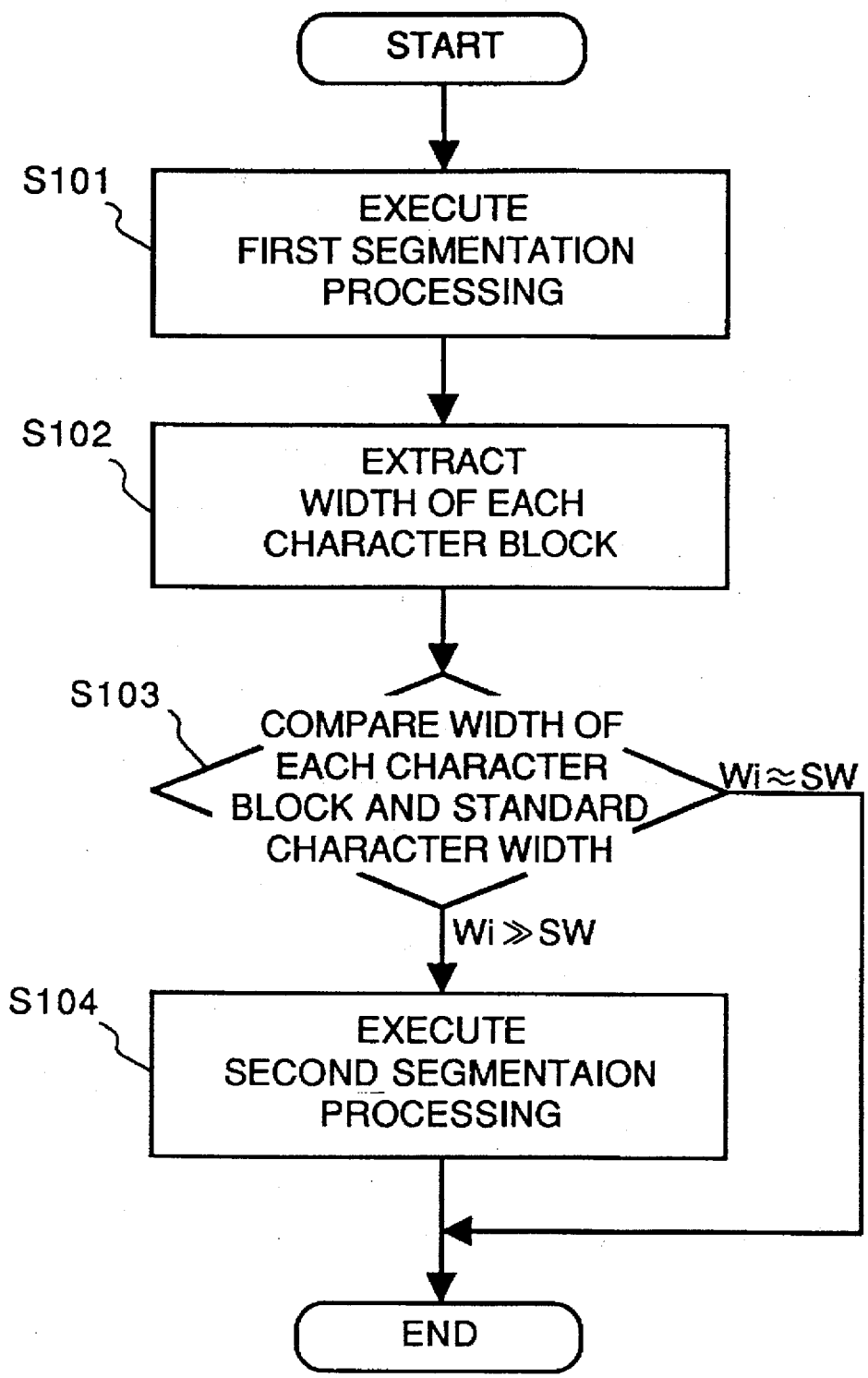
FIG. 10 is a flowchart showing the general features of character recognition processing in accordance with the second embodiment.
Figure 11:
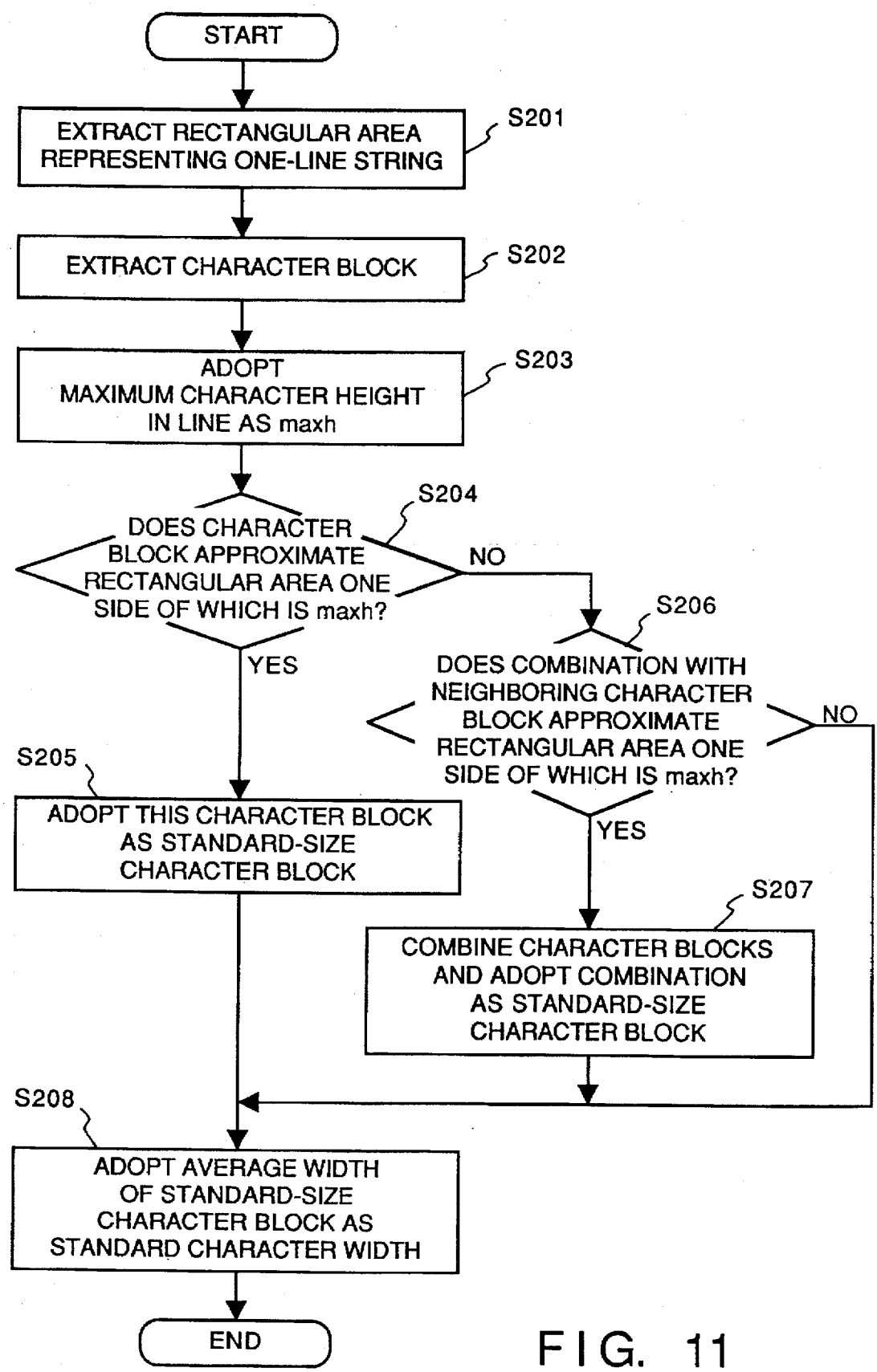
FIG. 11 is a flowchart showing character segmentation processing by projection.

At step S101 in FIG. 10, a primary segmentation is performed, in which use is made of the projection method. The details of primary segmentation processing will be described with reference to the flowchart shown in FIG. 11.

As in the example of the prior art described above, first a rectangular area representing a one-line string is segmented at step S201, then a character block is segmented at step S202. Next, maximum character height within the line is found at step S203, and this height is represented by "maxh". At step S204, it is examined whether a character block approximates a rectangular area one side of which has the length "maxh". If it is determined that the character block approximates a rectangular area one side of which has the length "maxh", then processing proceeds to step S205, where this character block is determined to be a character block of a standard size. On the other hand, if it is not determined that the character block approximates a rectangular area one side of which has the length "maxh", then processing proceeds to step S206. Here it is examined whether the result of combining this character block with a neighboring character block results in a rectangular area one side of which has the length "maxh". If it is determined that a rectangular area one side of which approximates the length "maxh" has been formed by the combination with the neighboring character block, then processing proceeds to step S207, where the combined block is adopted as being the character block of the standard size. On the other hand, if it is determined that a rectangular area one side of which approximates "maxh" has not been formed by the combination with the neighboring character block, then processing proceeds to step S208. Finally, at step S208, the average width of the character of the standard size is computed and this is adopted as the width of the standard character.

At step S102 in FIG. 10, the value of the width of each character block is extracted in order to determine whether the characters segmented at step S101 include any that are doubtful. Then, at step S103, the width ($W_i$: i=1, n) of each character block and the standard character width (SW) are compared. If it is determined that the value of $W_i$ is sufficiently large in comparison with the value of SW, then it is judged that re-execution of character segmentation is necessary and the processing proceeds to step S104 so that secondary segmentation may be carried out. Secondary segmentation employs the boundary tracing method. If it is determined that the values of $W_i$ and SW are not much different, then it is judged that re-execution of character segmentation is unnecessary and processing is terminated.

The details of secondary segmentation processing at step S104 will be described with reference to the flowchart of FIG. 12 and the input character string ("こうて" in this example) shown in FIG. 13. In FIG. 13, numeral 201 denotes the standard character width (SW), 202–204 denote re-segmented blocks, and B1–B7 represent character strokes.

Figure 12:
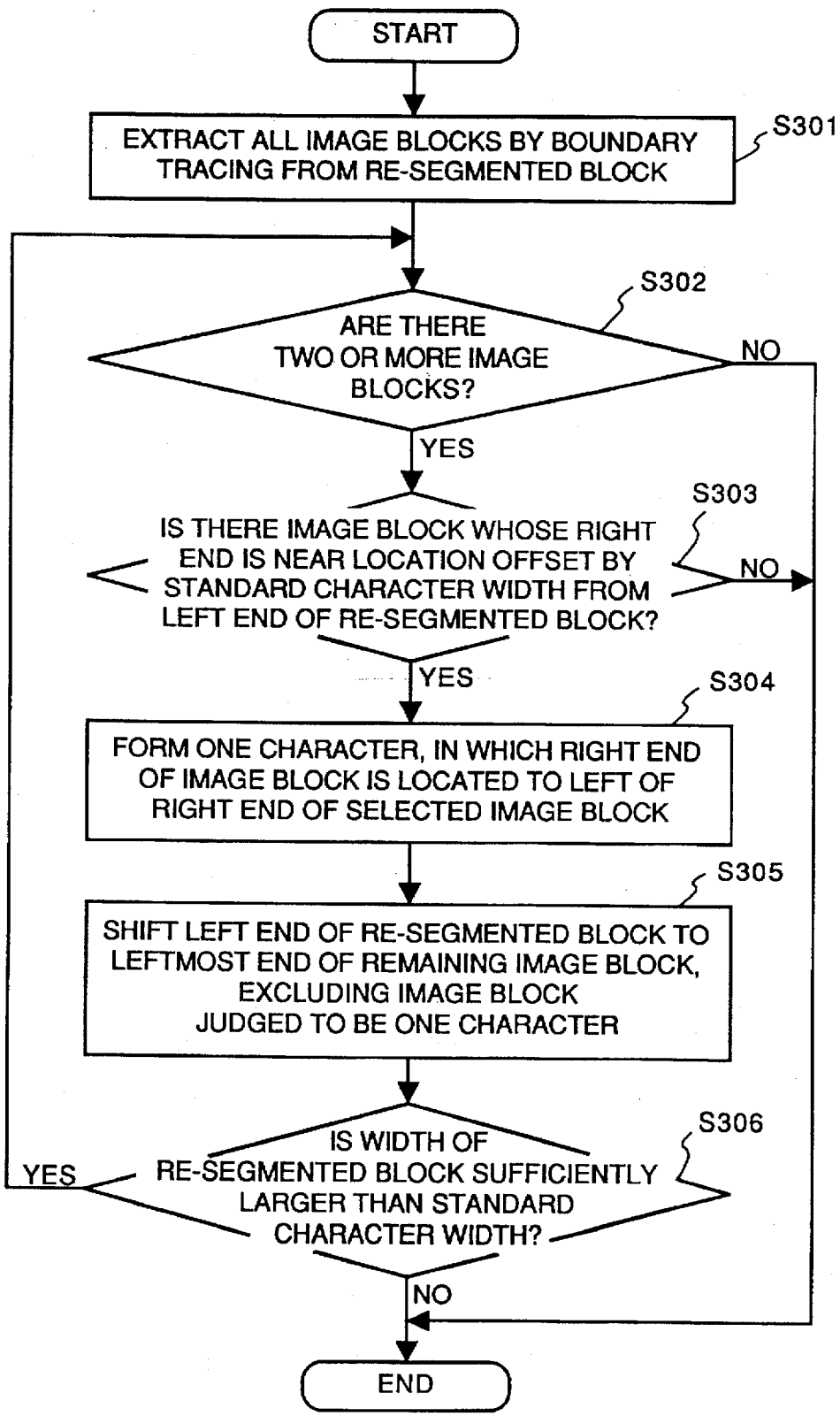
FIG. 12 is a flowchart showing character segmentation processing by boundary tracing.
Figure 13A:
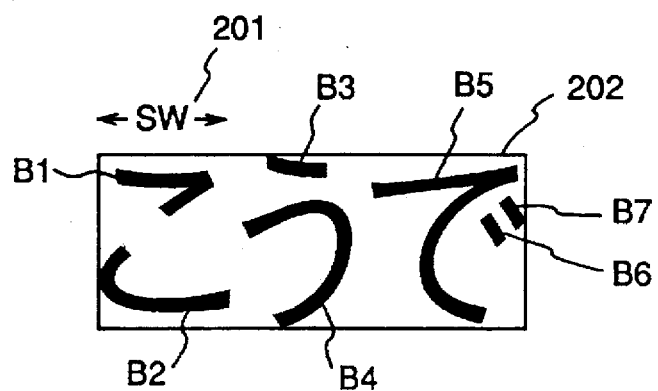
FIGS. 13A, 13B and 13C are diagrams for describing character segmentation by boundary tracing.
Figure 13B:
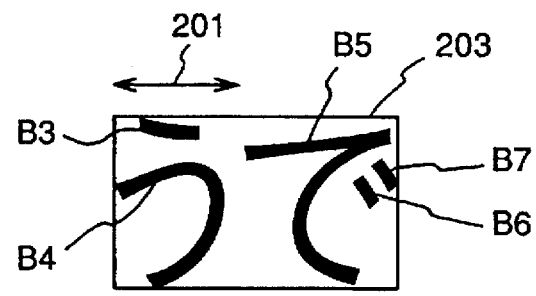
Figure 13C:
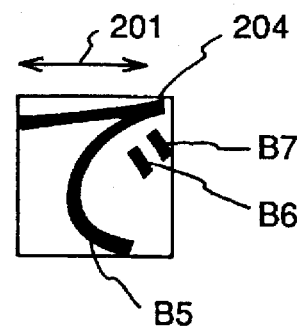

First, at step S301 in FIG. 12, all of the character strokes present in the re-segmented block 202 of FIG. 13A are obtained by the boundary tracing method described in the example of the prior art. The character strokes (CS) obtained by this method are B1–B7. It is examined at step S302 whether there are two or more character strokes in the re-segmented block 202. If the answer is YES, then processing proceeds to step S303. Processing is terminated if there is only one character stroke CS.

At step S303, a character stroke (B2) whose right end is at a location offset by the length of the standard character width (SW) from the left end of the re-segmented block 202 is found. Next, at step S304, is judged that one character is formed in combination with a character stroke (B1) whose right end is located to the left of the character stroke (B2) found at step S303. Next, at step S305, character segmentation processing is executed again in the re-segmented block 203 [FIG. 13B] from which the character strokes (B1 and B2) judged at step S304 to have formed one character are excluded. At this time, the left end of the re-segmented block 203 is taken as being the left end of the leftmost character stroke (B4) among the character strokes remaining (B3–B7).

Next, at step S306, it is again examined whether the width of the re-segmented block 203 is sufficiently larger than the standard width (SW) 201. If it is determined that the width of the re-segmented block 203 is sufficiently large in comparison with SW, then processing returns to step S302 and segmentation processing is executed again. On the other hand, if it is determined that the width of the re-segmented block 203 is not sufficiently large in comparison with SW, then processing is terminated.

By executing the foregoing processing, it is judged that the character string " こ ぅ て " shown in FIG. 13A is one in which the single character " こ " is formed by B1 and B2, the single character " ぅ " is formed by B3 and B4 and the single character " て " is formed by B5 through B7.

Thus, in accordance with this embodiment, ordinary character segmentation is executed by the projection method, and the boundary tracing method is applied only to portions in which character segmentation is doubtful. This makes highly accurate character segmentation possible even with regard to text in which kerning is present. Even in a case where it becomes necessary to utilize the boundary tracing method, only the left-right positional relationship of the characters need be taken into consideration with regard to judging the strokes constituting the characters. As a result, processing following stroke extraction is reduced and overall processing speed is raised.

[Third Embodiment (FIGS. 14, 15)]

Another embodiment of secondary segmentation processing set forth in the second embodiment will be described with reference to the flowchart of FIG. 14 and the input character string of FIG. 15. In FIG. 15, numeral 201 denotes the standard character width (SW), and 202 denotes a re-segmented character block. In order to specify the positions of pixels forming a character, an orthogonal coordinate system is considered in which the upper left end of the re-segmented block 202 is taken as the origin, the x axis is taken in the horizontal direction and the y axis is taken in the vertical direction. This embodiment uses the character recognition apparatus described in the second embodiment, and therefore a description of the apparatus will not be repeated. In addition, the other steps in the character recognition processing operation are identical with those of the second embodiment and need not be described again.

Figure 14:
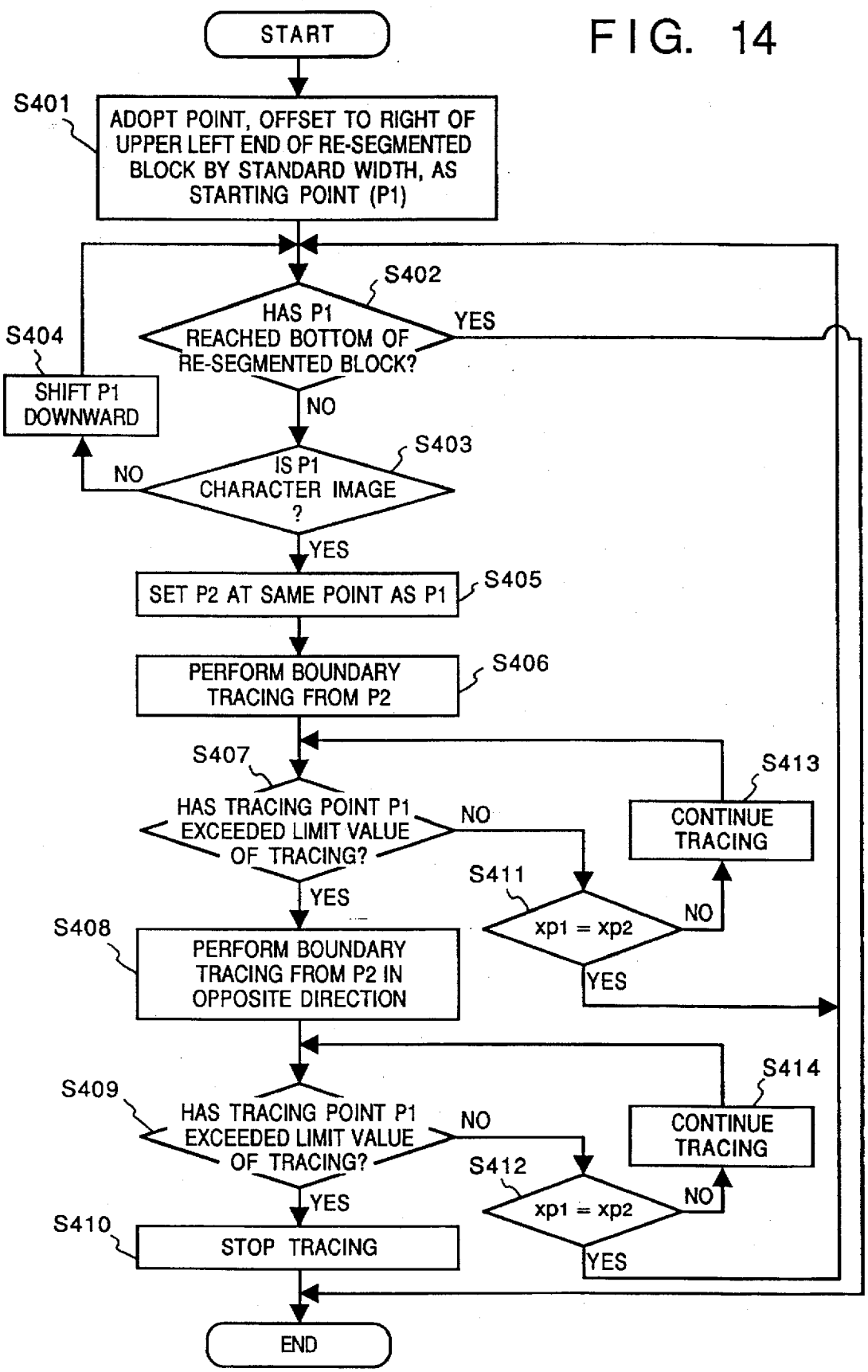
FIG. 14 is a flowchart showing character segmentation processing by boundary tracing in accordance with a third embodiment.
Figure 15:
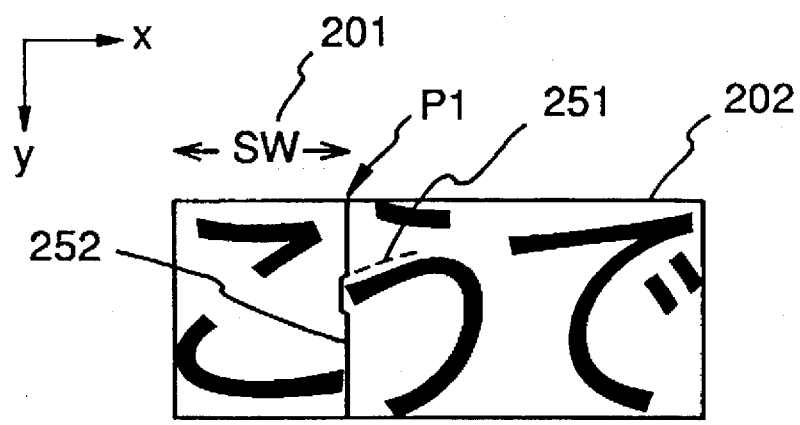
FIG. 15 is a diagram for describing character segmentation by boundary tracing in accordance with the third embodiment.

First, at step S401 in FIG. 14, a point offset to the right of the upper left end of the re-segmented block 202 by the standard width (SW) 201 is obtained, and this point is represented by $P_1$ [$x_{P1}$ (=SW), $y_{P1}$ (=0)]. This is adopted as the starting point of boundary tracing and P1 represents a tracing point. Next, it is examined at step S402 whether P1 has reached the lower end of the re-segmented block 202 (that is, whether it has reached the end point of character segmentation). If it is determined here that P1 has reached the lower end of the re-segmented block 202, processing is terminated. If it is determined that P1 has not yet reached the lower end of the re-segmented block 202, then processing proceeds to step S403.

It is examined at step S403 whether the pixel at P1 is a pixel constituting a character image. If it is determined here that the pixel at P1 is a pixel constituting a character image, then processing proceeds to step S405; otherwise, processing proceeds to step S404, the position of P1 is shifted vertically downward by one pixel and processing returns to step S402. At step S405, the pixel forming the character image detected at step S403 is stored as P2 ($x_{P2}$, $y_{P2}$). Here P2 represents a point at which the pixel forming the character image has been detected, namely the boundary-tracing starting point of an actual character stroke. This is followed by step S406, at which boundary tracing described in the example of the prior art is performed from the location of point P2. From this location, the value of P1 changes along the boundary of the character stroke. In accordance with the description in the example of the prior art, the boundary is searched in the clockwise direction from the point of interest. Tracing is carried out in the manner indicated by the dashed line 251 in FIG. 15.

Since the original objective of this embodiment is efficient segmentation processing, the arrangement is such that the boundary tracing processing is provided with a fixed limit, wherein tracing is not carried out when the limit is exceeded. In the case of this embodiment, the limit value is that at which the x coordinate ($x_{P1}$) of P1 becomes equal to the x coordinate of the right end of the re-segmented block 202 (i.e., that at which P1 reaches the right end of the re-segmented block 202). Alternatively, the limit value is that at which the x coordinate ($x_{P1}$) of P1 becomes ±SW/2 from the x coordinate ($x_{P2}$) of P2.

It is examined at step S407 whether P1 has exceeded the limit value of boundary tracing. If the answer is YES, then processing proceeds to step S408 and tracing is performed again from P2 in the counter-clockwise direction. If it is determined that the limit value has not been exceeded, processing proceeds to step S411 and it is examined whether the x coordinate ($x_{P1}$) of P1 has become equal to the x coordinate ($x_{P2}$) of P2. If $x_{P1} \neq x_{P2}$ holds, processing proceeds to step S413 and tracing is continued. If $x_{P1} = x_{P2}$ holds, processing returns to step S402.

It is again determined at step S409 whether P1 has exceeded the limit value of boundary tracing. If it is determined that the limit value has been exceeded, then processing proceeds to step S410, it is judged that segmentation processing cannot be performed and processing is suspended. If it is judged that the limit value has not been exceeded, on the other hand, then processing proceeds to step S412, at which it is determined whether the x coordinate ($x_{P1}$) of $P_1$ is equal to the x coordinated ($x_{P2}$) of $P_2$. If $x_{P1} \neq x_{P2}$ holds, then processing proceeds to step S414 and tracing is continued. If $x_{P1} = x_{P2}$ holds, then processing returns to step S402.

By executing the foregoing processing, a character segmentation line of the kind shown at 252 in FIG. 15 is finally obtained.

Thus, in accordance with this embodiment, not only is the zigzag segmentation line 252 in FIG. 15 obtained but it is also possible to hold boundary tracing to the minimum so that tracing processing can be held to the minimum.

The foregoing embodiment is described with reference to a method using boundary tracing and projection as the segmentation method. However, this does not impose a limitation upon the present invention. In addition, the present invention is not limited to the foregoing embodiment also with respect to the prescribed form of a document, such as the way in which the document is constructed.

Further, though the foregoing embodiment has been described for a case in which segmentation processing is performed by the CPU 101, this does not impose a limitation upon the invention. For example, it is possible to use an apparatus having a processor dedicated to execution of segmentation processing, such as an apparatus having the construction described in the first embodiment.

[Fourth Embodiment (FIGS. 16-20)]

Processing will now be described in which misrecognition arising from character segmentation is corrected again automatically even when a series of recognition processing operations has been completed. The character recognition operation used in this embodiment is of substantially the same construction as that of the apparatus used in the second and third embodiments, and therefore the same elements are designated by like reference characters and need not be described again.

<Description of elements specific to this embodiment (FIG. 16)>

Figure 16:
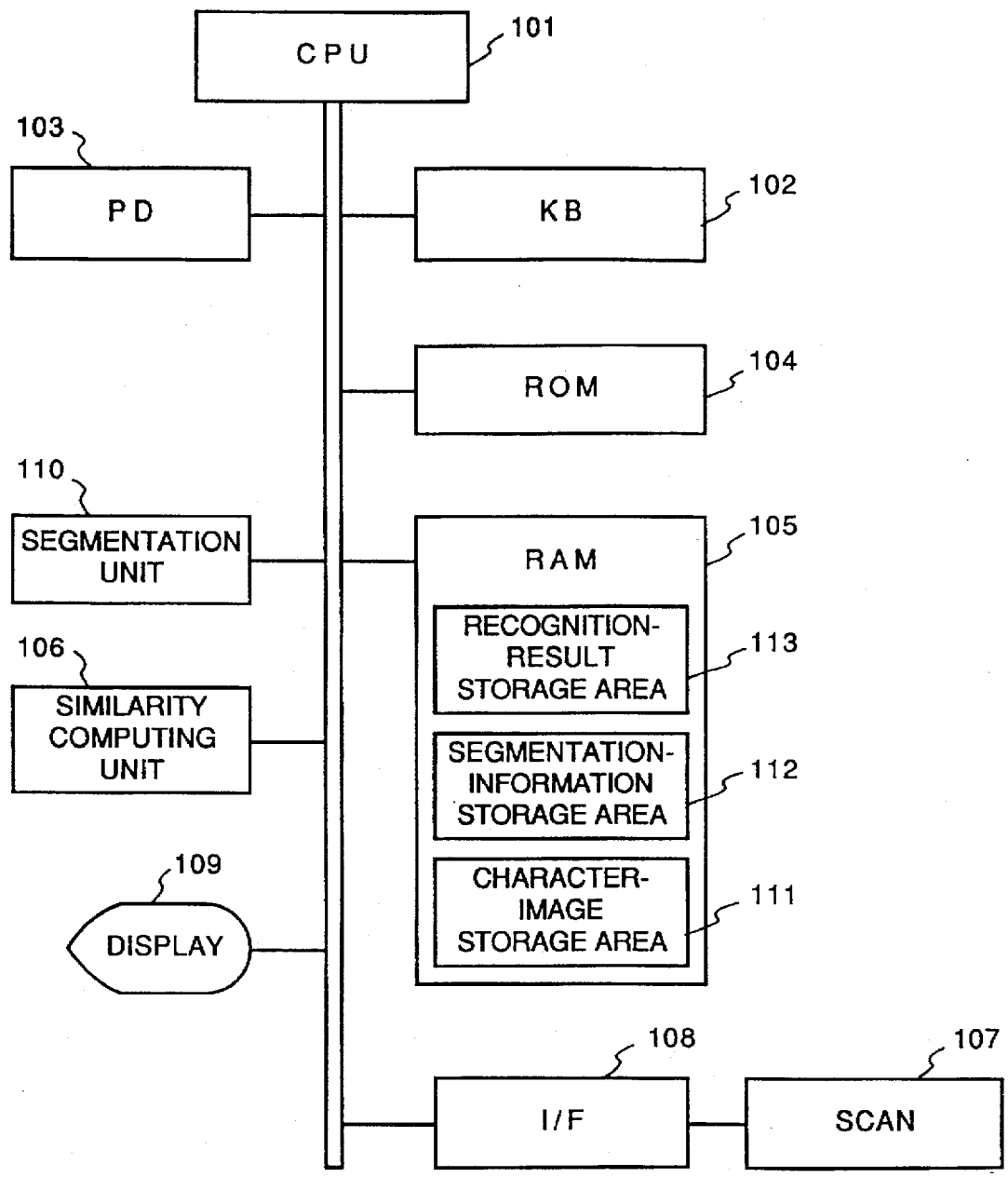
FIG. 16 is a block diagram illustrating the construction of a character recognition apparatus in accordance with a fourth embodiment of the present invention.

FIG. 16 is a block diagram showing the construction of a character recognition apparatus used in this embodiment. The apparatus includes a segmentation unit 110 for segmenting characters from a character image one character at a time. The RAM 105 has a character-image storage area 111 for storing a character image read by the image scanner 107, a segmentation-information storage area 112 for storing the output of the character segmentation unit 110, and a recognition-result storage unit 113 for storing the output of the similarity computing unit 106.

<Description of character recognition processing (FIGS. 17~19)>

Figure 17:
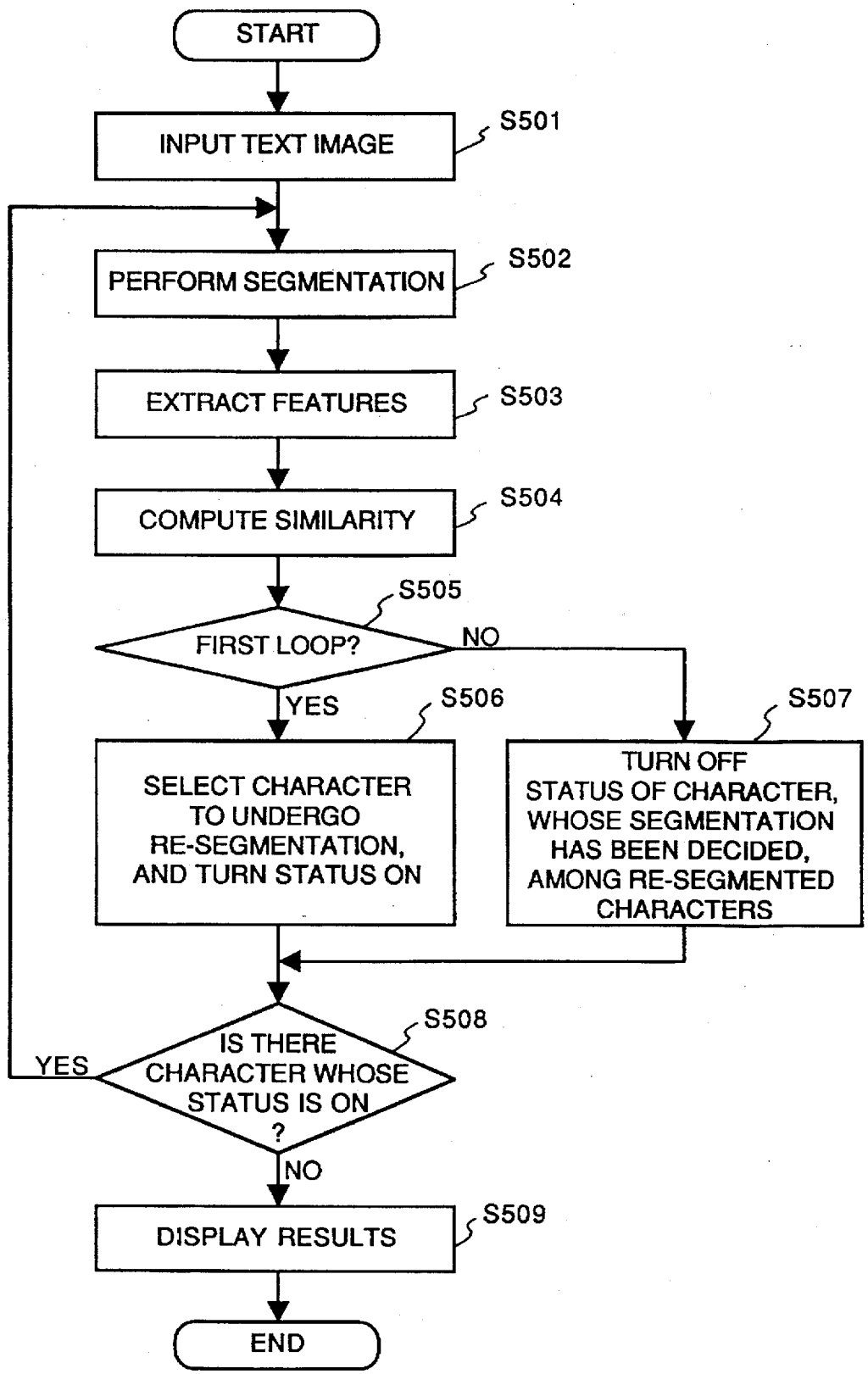
FIG. 17 is a flowchart showing character recognition processing in which re-execution of character segmentation executed by the character recognition apparatus of FIG. 16 is possible.

Character recognition processing executed using the character recognition apparatus having the construction set forth above will now be described with reference to the flowchart of FIG. 17.

First, at step S501, the character image is inputted from the image scanner 107 and stored in the character-image storage area 111. Next, at step S502, the segmentation unit 110 segments characters from the stored character image one character at a time. Though there is no particular limitation upon the method of segmentation, the-method of taking projections of character images is used in this embodiment.

Figure 18:
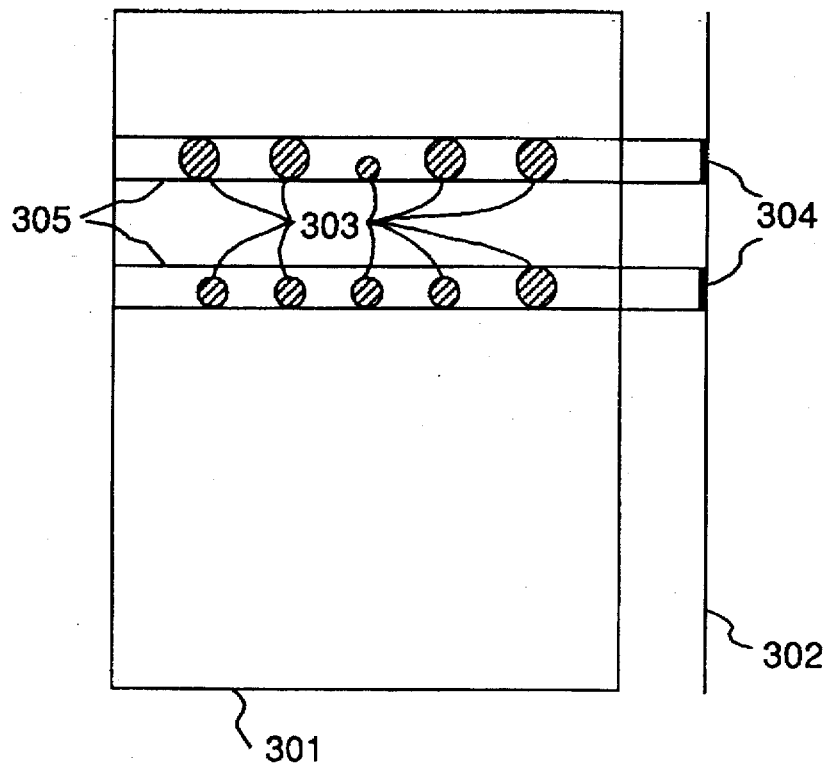
FIG. 18 is a diagram showing the manner in which a projection is taken in the horizontal direction of laterally written characters.
Figure 19:
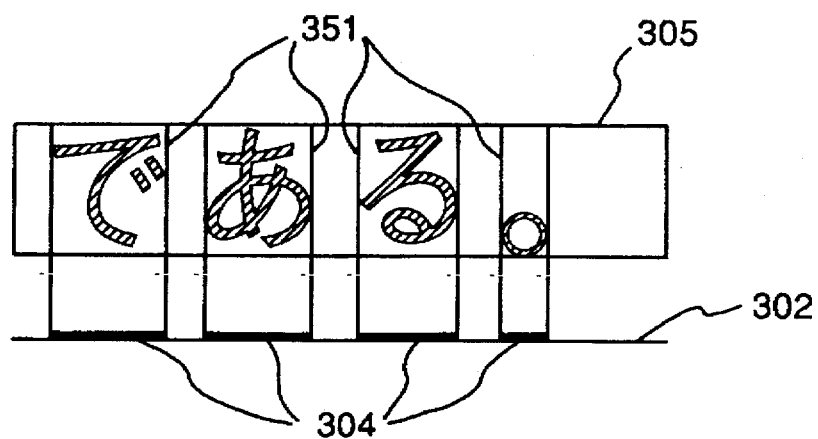
FIG. 19 is a diagram showing the manner in which a projection is taken in the vertical direction of laterally written characters.

FIG. 18 is a diagram showing the manner in which segmentation is executed in accordance with the projection method. In FIG. 18, numeral 301 denotes an input text image, and 302 designates a projection plane. The projection is taken in the horizontal direction if the inputted image original is a laterally written document and in the vertical direction if the inputted image original is a vertically written document. In the case of FIG. 18, the document is laterally written and therefore projections 304 are taken for character images 303 to obtain rectangular areas 305 representing one-line character strings. FIG. 19 is a diagram showing the manner in which projections in the vertical direction are taken with respect to the rectangular area 305 obtained. When a projection in the horizontal direction has been obtained, the projection plane is then rotated by 90° and a projection is taken, whereupon character rectangles 351 are obtained and characters are segmented one character at a time. The result of this segmentation is outputted to the segmentation-information storage area 112.

The features are extracted from the character images of the character rectangles 351 at step S503, and a similarity computation is performed by the similarity computing unit 106 at step S504 using the features extracted. The results of computation are outputted to the recognition-result storage area 113. The output information contains n-number of computed values and character codes from categories having high degrees of similarity, by way of example.

The processing of steps S501~S504 is in accordance with the prior art.

The number of times the series of processing operations of steps S502~S504 has been executed is determined at step S505. If the series of processing operations has just begun, then processing proceeds to step S506. If the operations have been executed two or more times, processing proceeds to step S507. A character-image block which will undergo segmentation again is selected at step S506. This selection is assumed to be a case in which the computed value of a category for which the maximum similarity has been obtained is less than a predetermined threshold value (TH). With regard to a selected character-image block, a re-segmentation status flag (ISFLG) managed by the CPU 101 is set to "1 " (the ON state). At step S507, the segmentation status flag (ISFLG) of a character which has undergone re-segmentation is investigated and the flag (ISFLG) is set to "0" with regard to a character whose similarity value is sufficiently greater than the predetermined threshold value (TH) and which need not undergo segmentation again.

The segmentation status flag (ISFLG) is a flag set for each segmented character and is stored in the segmentation-information storage area 112 of RAM 105.

It is examined at step S508 whether there is a character for which the status flag (ISFLG) is in the ON state. If a character whose flag is in the ON state exists, then processing returns to step S502 and this character is subjected to segmentation again. If a character whose flag is in the ON state does not exist, processing proceeds to step S509, the result is displayed on the display 109 and processing is terminated.

<Specific example of character recognition processing (FIG. 20)>

The foregoing processing will be described in detail by imagining a case in which the character images shown in FIG. 20 are inputted. The characters shown in FIG. 20A are assumed to be the input image characters.

In the initial segmentation, first projections are taken from the input character images as described in step S502, whereby there are obtained six image blocks 401~406, as illustrated in FIG. 20B. Next, by taking a standard character width, described below, as a reference, image blocks of comparatively small width (blocks 401, 402, 403) are joined, so that four image blocks 405, 406, 407 are obtained, as shown in FIG. 20C. Here the standard character width is taken to be the average value of the widths of character rectangles having a width that is close to the height of the rectangular area 305 representing a one-line string.

Next, after the processing of steps S503~S505 is executed, a character image block to undergo re-segmentation is selected at step S506. Here it is assumed that the character-segmentation status flags (ISFLG) of the character image blocks 407 and 408 shown in FIG. 20C are ON. In segmentation from the second onward at step S502, only a character image block whose status flag (ISFLG) is ON is subjected to processing.

In the second segmentation operation, first the connection between the leading block and following blocks of continuous re-segmented image blocks is investigated. In the case of FIG. 20B, the character image blocks 401~404 are continuous blocks, and it is confirmed whether the leading block 401 is connected to the blocks 402~404. However, the width of connected character image blocks is set so as to fall within a fixed multiple of the character width, and the number of combinations is limited. As a result, it is assumed that there are three combinations, namely block 401 alone, the combination of blocks 401 and 402, and the combination of blocks 401, 402 and 403. The processing of steps S503~S505 is executed with regard to these combined character images. Finally, at step S507, the combination having the highest degree of similarity and a value sufficiently larger than the predetermined threshold value (TH) is adopted as the result of segmentation. Here it is assumed that solely the character image block 401 satisfies these conditions and therefore the segmentation status flag (ISFLG) of the character image block 401 is turned OFF. At this point in time, segmentation takes on the state shown in FIG. 20D. In the third segmentation operation, the connection between the character image block 402 and the other blocks (here 403 and 404) is investigated. If, when the character image blocks 402 and 403 are connected in the third trial, it is judged that the degree of similarity is maximum and the predetermined threshold value (TH) is sufficiently exceeded, the two blocks are connected to form one character image block 409 and the segmentation status flag (ISFLG) for this block is turned OFF.

In the fourth and final segmentation, the character image block 404 remains so that the processing of steps S502–S505 is applied to this block. At step S507, the status flag (ISFLG) is turned off. By virtue of the foregoing processing, character image blocks 401, 409, 404–406 subdivided in the manner shown in FIG. 20E are obtained.

If characters for which the flag (ISFLG) has been turned ON at step S506 are not subdivided into a plurality of character image blocks by execution of the next segmentation processing cycle and there are no other image blocks present in the neighboring portion, then it is judged that segmentation processing at step S506 in the ensuing loop is not erroneous and the status flag (ISFLG) is turned OFF so that re-segmentation will not be performed.

Therefore, in accordance with this embodiment, first the input image is subjected to overall segmentation, features are extracted, similarity is computed, portions which require re-segmentation are determined based upon the results of similarity computation, and segmentation, feature extraction and similarity computation are subsequently repeated. As a result, even if a series of recognition processing operations has been completed, misrecognition arising from character segmentation can be corrected.

[Fifth Embodiment (FIGS. 21, 22)]

Figure 21:
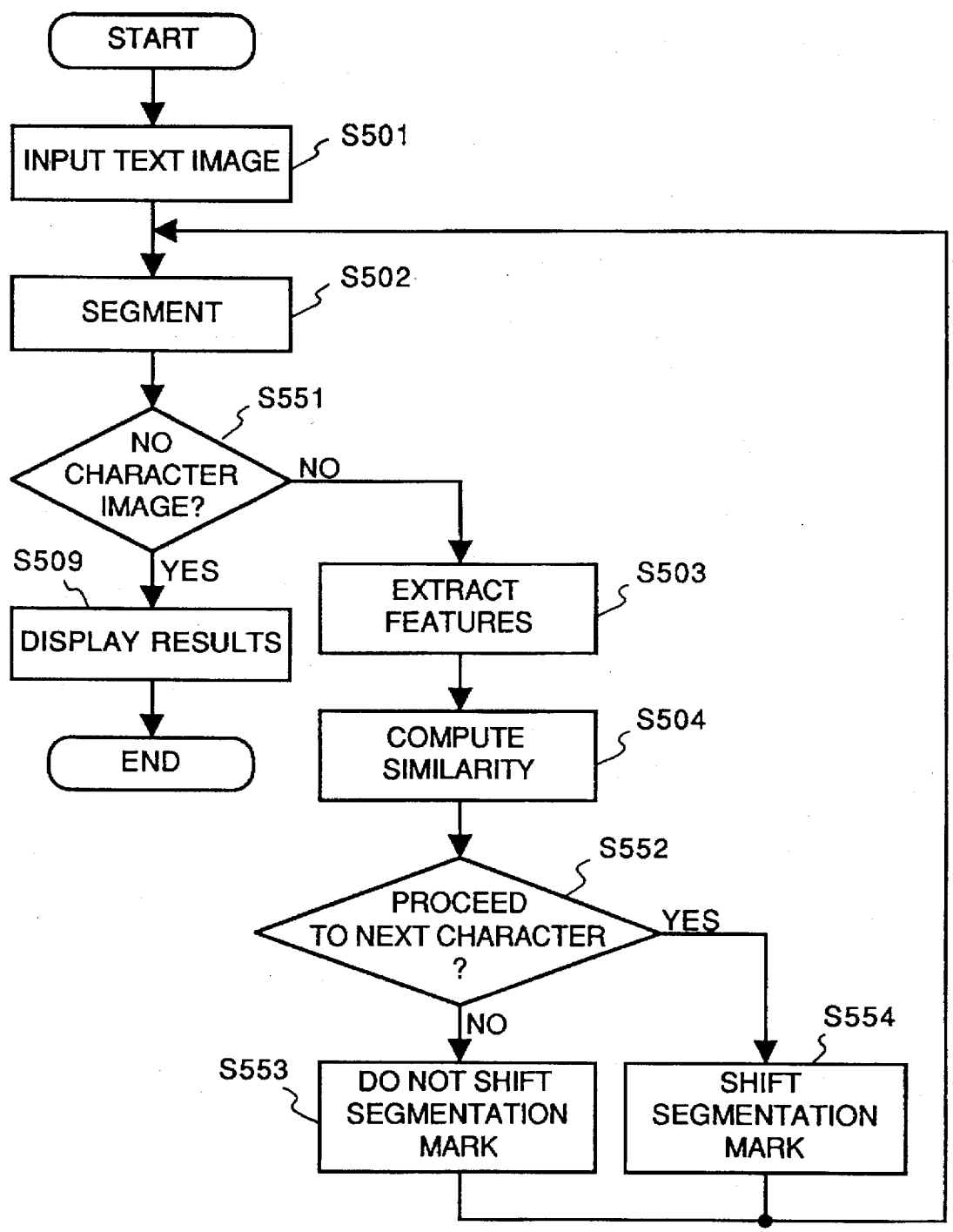
FIG. 21 is a flowchart showing character recognition processing in accordance with a fifth embodiment.

Here reference will be had to the flowchart of FIG. 21 and a specific example shown in FIG. 22 to describe processing for performing sequential character recognition, while characters are segmented one character at a time, with the pattern recognition apparatus used in the fourth embodiment serving as the apparatus employed for this processing. Since the apparatus is the same as that of the above embodiment, the same reference numerals will be used for common elements and these elements need not be described again. In the processing of this embodiment, steps identical with those of the earlier embodiments are designated by like step numbers and these steps will not be described again.

The present embodiment uses a logical marker in order to grasp the state of execution of character-by-character sequential character recognition processing. The marker is always situated in a character image block which undergoes segmentation, and segmentation is carried out with the marker position serving as the origin. At the moment it is judged that character segmentation is satisfactory, the marker is moved to the next character image block and the next character image block is segmented.

Figure 22A:
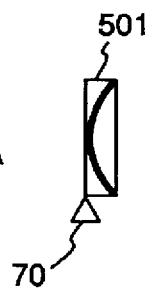
FIGS. 22A, 22B, 22C, 22D and 22E are diagrams showing the manner in which character segmentation is corrected in accordance with the fifth embodiment.

After the image original is inputted at step S501, only the leading character of the character images in the input image is segmented, as shown in FIG. 22A. As a result, the character image block 501 is segmented from the input image. At this time, a marker 70 is situated on the left side of the character image block 501. Here, in accordance with the segmentation method which relies upon projection, one character of the character image is segmented by obtaining the rectangular area 305 of a one-line character string and then taking a projection in the direction perpendicular to the line direction from the leading portion of the leading line, as described in the foregoing embodiment.

Next, it is examined at step S551 whether there is a segmented character. If it is determined here that there is a segmented character image block, then processing proceeds to step S503 and S504, where feature extraction and similarity computation are carried out, respectively. On the other hand, if it is determined that there is no segmented character image block, then processing proceeds to step S509, the result of processing is displayed and processing is terminated.

After the processing of steps S503 and S504 is executed, it is determined, based upon the computed values obtained from the similarity computation, whether segmentation processing is to be executed again or not. If, as in the foregoing embodiment, a computed value of a category for which a degree of similarity has been obtained is less than the predetermined threshold value (TH), processing proceeds to step S553 and re-segmentation processing is executed. Consequently, the marker 70 is not moved. On the other hand, if the computed value is greater than the predetermined threshold value (TH), processing proceeds to step S554 and it is decided to advance to segmentation of the next character. As a consequence, the marker 70 is moved to the left side of the next character image block or to the right side of a character image block that has been decided. After the processing of steps S553, S554 is executed, processing returns to step S502 and segmentation is continued.

Since step S552 is situated in the processing loop S502–S553 or S502–S554, how many times segmentation processing is re-executed is decided. Accordingly, the immediately preceding computed value of similarity and the present computed value of similarity are compared. If the preceding segmentation exhibits results relatively better than the results of the present segmentation, it is judged to execute re-segmentation at the preceding determination. However, there are cases where it is judged that no further segmentation is to be performed at the present determination and it is decided to adopt the results of the preceding segmentation.

In order to consider this in more detail, an input of the image original "いろんな" will be assumed and this will be described with reference to FIG. 22.

Figure 22B:
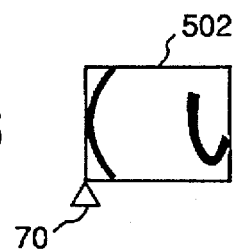

In a case where the character image block 501 is extracted by the initial segmentation, as shown in FIG. 22A, and it is determined at step S552 that processing should proceed to step S553, assume that a character image 502 joined to the next character image has been extracted by the next segmentation, as illustrated in FIG. 22B. At this point, the marker 70 indicating the segmentation origin is on the left side of character image block 501 or 502, as shown in FIGS. 22A and 22B.

Figure 22C:
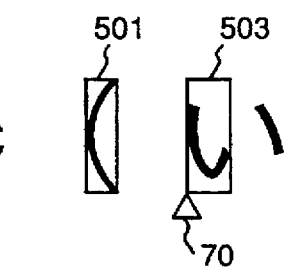
Figure 22D:
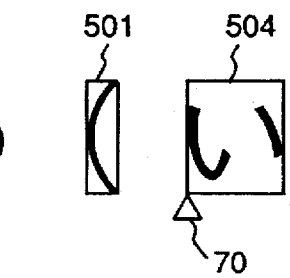
Figure 22E:
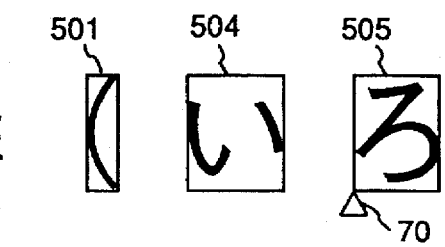

However, if it is determined at the next processing of step S552 that it is better to perform segmentation at the character image block 501, processing proceeds to step S554, the marker 70 is shifted to the right side of character image block 501 and character image block 503 is extracted at the third segmentation, as shown in FIG. 22C. At this point, the marker 70 indicating the segmentation origin is shifted to the left side of character image block 503 or 502, as shown in FIG. 22C. If processing proceeds to step S553 owing to the judgment of the third execution of step S552, the position of marker 70 is not shifted. In the fourth segmentation, a character image block 504 connected to the next is extracted, as shown in FIG. 22D. If it is determined at the fourth execution of step S552 that it is better to perform segmentation at the character image block 504, processing proceeds to step S554, the marker 70 is shifted to the right side of character image block 504 and the next character image block is segmented at the fifth segmentation, as shown in FIG. 22E.

Thereafter, and in similar fashion, character image blocks are segmented sequentially. When all of the character images have been segmented, processing proceeds to step S509 and the results are displayed.

Thus, in accordance with this embodiment, recognition processing is executed sequentially with character segmentation, feature extraction and similarity computation being performed one character at a time. As a result, it is possible to proceed with character recognition while preventing misrecognition arising from segmentation.

The foregoing embodiment is described based upon use of an apparatus in which the processing of the segmentation unit and similarity computing unit is executed by a special-purpose processor. However, this does not impose a limitation upon the invention. For example, the apparatus can be one in which a CPU executes these processing operations.

Further, the segmentation method is described based upon use of the projection method in the foregoing embodiment. However, this does not impose a limitation upon the invention. For example, another method such as the boundary tracing method can be used.

In the embodiment set forth above, it is described that segmentation is executed with regard to the entire input image using a comparatively short character string "いろんと" as the input image. However, this does not impose a limitation upon the invention. For example, it is possible to execute segmentation within a designated range or line by line if the input image is a long sentence.

[Sixth Embodiment (FIGS. 23~28)]

Here processing will be described in which segmentation of characters having different widths, such as characters in the English alphabet, as shown in FIG. 38, is obtained by tracing of possible partitioning points. The character recognition apparatus used is the same as that shown in FIG. 9. The construction of the apparatus is the same as in the second embodiment and common elements are designated by like reference characters. The apparatus need not be described in detail again.

Figure 23:
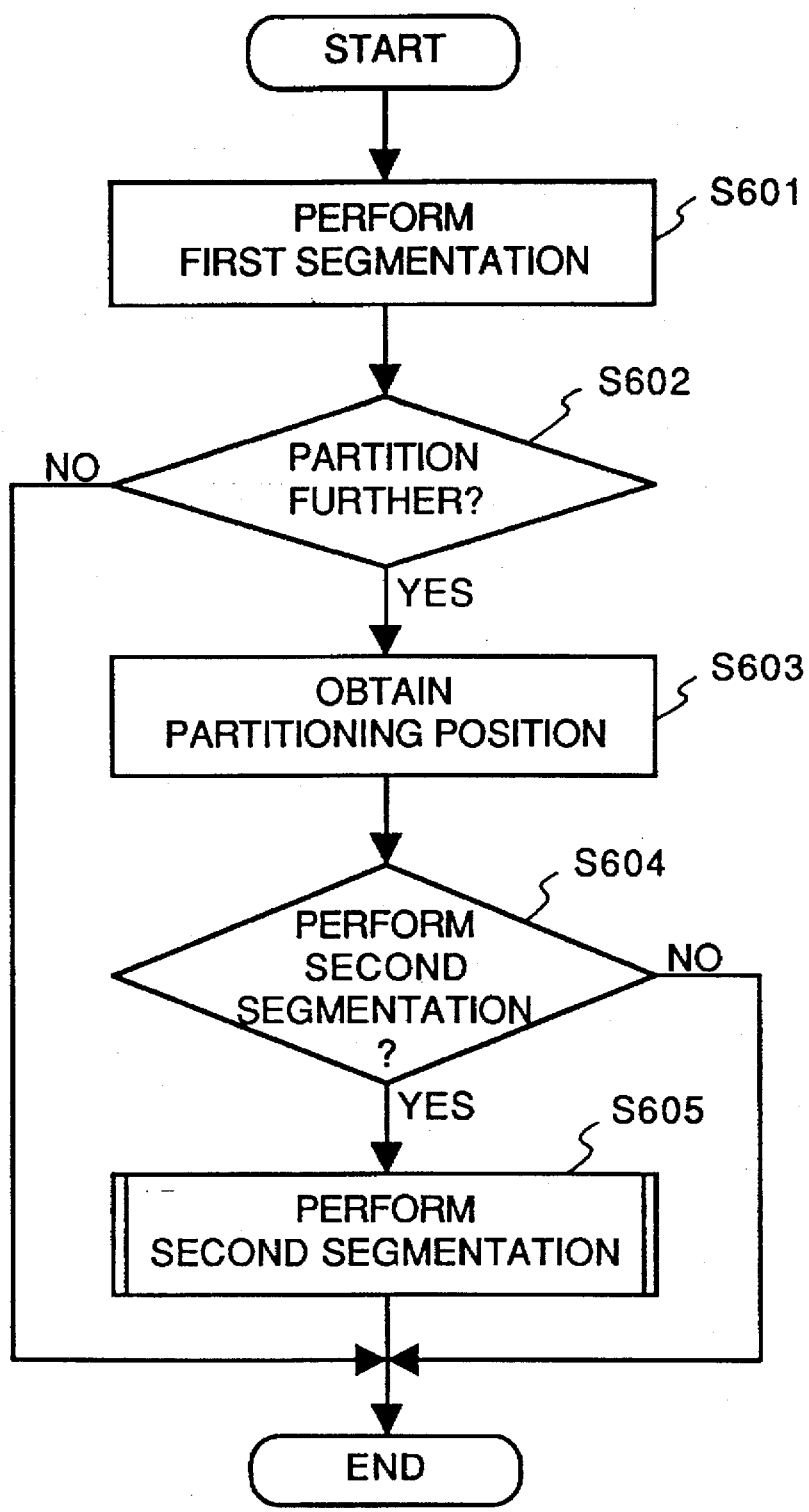
FIG. 23 is a flowchart showing character segmentation processing in character recognition processing in accordance with a sixth embodiment.

FIG. 23 is a flowchart showing the entirety of segmentation processing executed by the character recognition apparatus having the construction shown in FIG. 9.

First, at step S601, a first segmentation is performed by taking a projection in accordance with the prior art. Then, at step S602, it is determined whether a segmented character image is capable of being partitioned further. In a case where a segmented character image is capable of being partitioned, processing proceeds to step S603, where the possible partitioning point is obtained. Next, at step S604, it is determined whether second segmentation processing is to be performed in accordance with the possible partitioning point obtained at step S603. In a case where it is decided that second segmentation processing is possible, then processing proceeds to step S605 and a second segmentation is executed. Processing is terminated if it is determined at step S602 that a segment character image cannot be partitioned further.

Figure 24B:
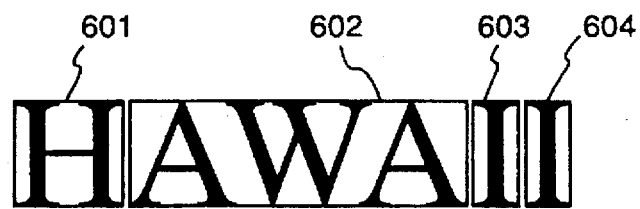
Figure 24C:

Each of the foregoing processing steps will be described in greater detail with reference to character images of the English alphabet having a professional spacing, as shown in FIG. 24. FIG. 24A shows the inputted character images, which are to be subjected to segmentation. First, at step S601, the projection method is used as the first segmentation processing. In accordance with this method, first a rectangular area representing a one-line string is segmented by taking projections in the line direction with regard to the entire input image. Thereafter, projections in the direction perpendicular to the lines are taken for every segmented rectangular area, thereby segmenting the character images. As a result, four rectangular areas 601, 602, 603 and 604 are obtained, as shown in FIG. 24B.

Next, at step S602, it is decided whether each rectangular area obtained at step S601 is to be partitioned further. An example of a method of deciding this is to make the decision based upon the ratio of height to width of each rectangle (601, 602, 603, 604). Another method is to made the decision upon comparing rectangle width with a certain threshold value. Further, a processing procedure can be adopted in which the processing of step S602 is deleted and a partitioning position is obtained unconditionally at step S603.

The partitioning position of a character image is obtained at step S603. According to this processing step, lines 605, 606, 607, 608 are drawn at a position located at half the height of the character rectangle. The mid-points [indicated by "x" in FIG. 24C] on these lines of portions at which white pixels are continuous are regarded as being partitioning points. Next, it is examined at step S604 whether a partitioning point obtained at step S603 exists in the character rectangles (601, 602, 603, 604). If it is determined that a partitioning point exists, then second segmentation processing is executed at step S605. In case of the example shown in FIG. 24C, partitioning points [indicated by "x" in FIG. 24C] exist in character rectangles 601 and 602, and therefore second segmentation processing is executed with regard to these two rectangles.

Figure 25A:
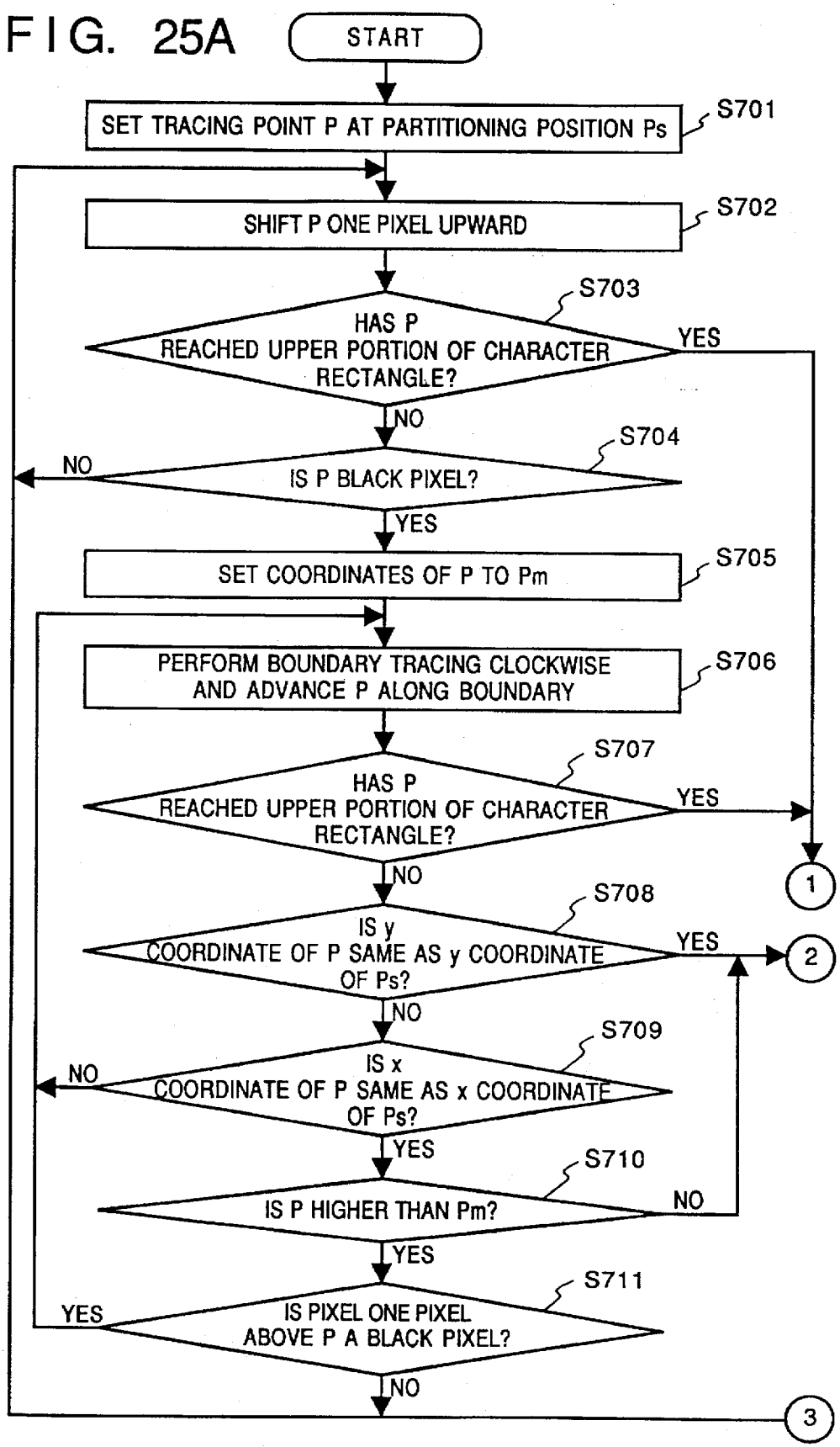
Figure 25B:
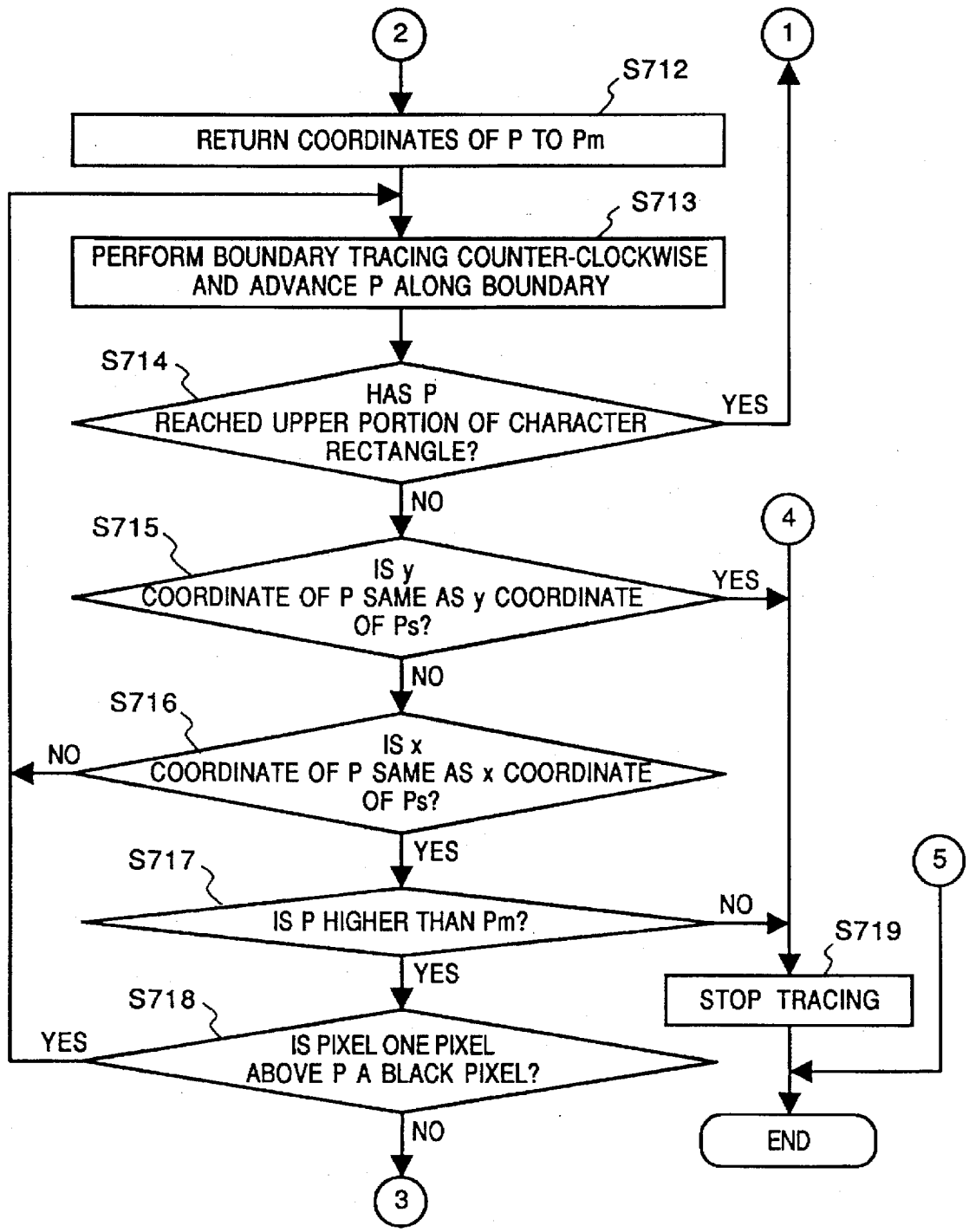
Figure 26A:
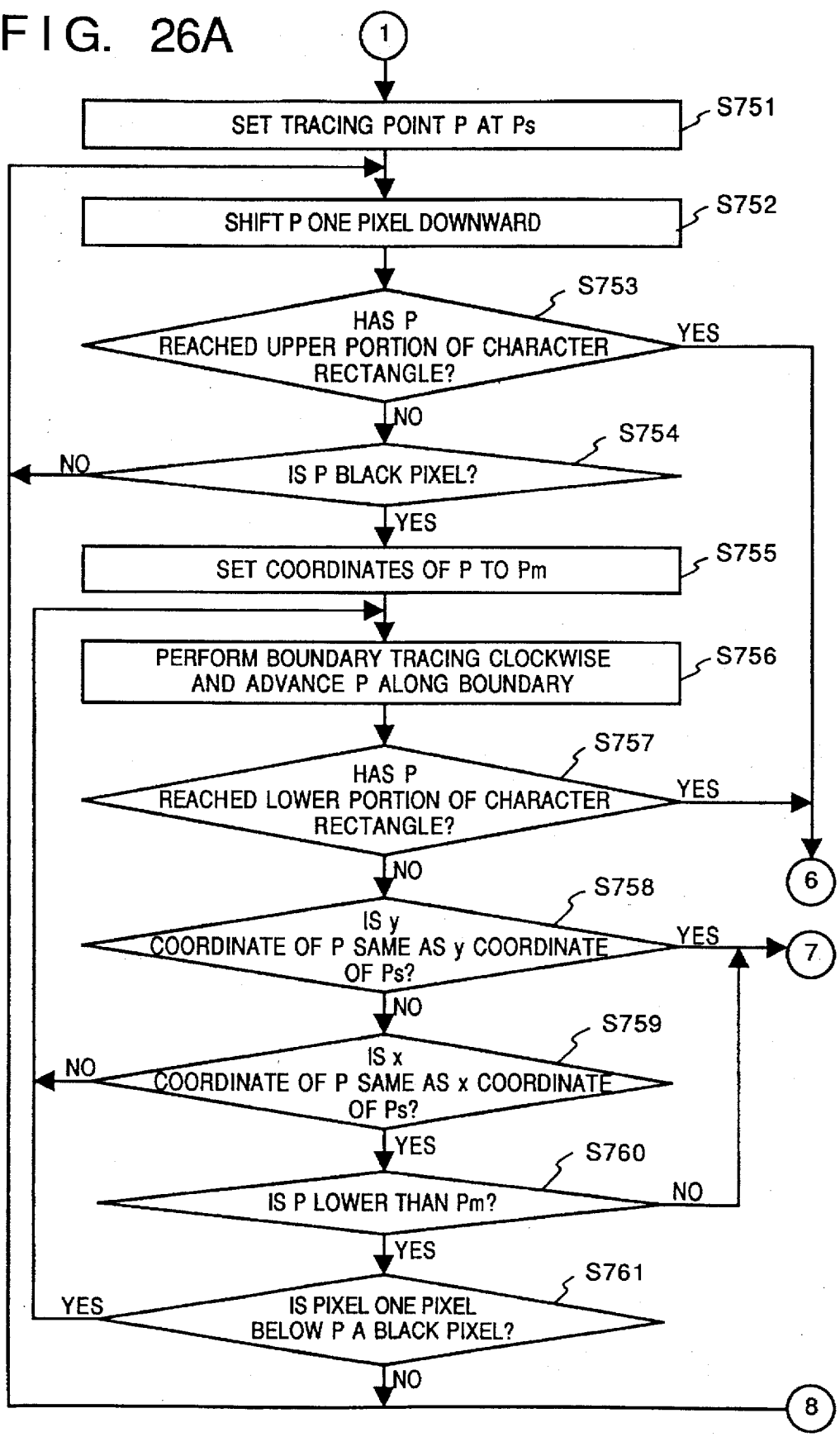

The details of second segmentation processing will be described with reference to the flowcharts shown in FIGS. 25 and 26. In this processing, the rectangles are partitioned further by performing tracing up and down from the partitioning positions obtained at step S603. The processing shown in FIGS. 25A and 25B illustrates second segmentation processing for performing upward tracing from partitioning points, and the processing shown in FIGS. 26A and 26B illustrates second segmentation processing for performing downward tracing from partitioning points. In the description that follows, a coordinate system is set in which the horizontal and vertical directions of the rectangles are taken along the X and Y axes. Let $P_S$ represent a partitioning position in each rectangle.

First, at step S701, a tracing point (P) for finding partitioning positions is placed at $P_S$. Next, at step S702, the y coordinate of P is shifted one pixel upward in order to try partitioning upwardly from $P_S$. Then, at step S703, it is examined whether the coordinate of the shifted point P has reached the upper end of the rectangle in which partitioning is presently being attempted. (In other words, it is examined whether upwardly directly partitioning of the character rectangle has been completed.) If it is determined that the coordinate of P has reached the upper end of the rectangle, processing proceeds to step S751 and partitioning is tried downwardly from $P_S$. On the other hand, if it is determined that the coordinate of the shifted point P has not yet reached the upper end of the rectangle, processing proceeds to step S704, where it is examined whether the value of the pixel at the position of the shifted point P is that of a black pixel or white pixel. If the value is not that of a black pixel, processing returns to step S702 and the y coordinate of P is shifted further in the upward direction. On the other hand, if the value of the pixel at the position of P is that of a black pixel, processing proceeds to step S705, where the boundary line (of the black-pixel area) of the character image is traced in the clockwise direction and the counter-clockwise direction.

Processing for tracing the boundary line of the black-pixel area in the clockwise direction is indicated at steps S706–S711, and processing for tracing the boundary line of the black-pixel area in the counter-clockwise direction is indicated at steps S712–S718.

Figure 28A:
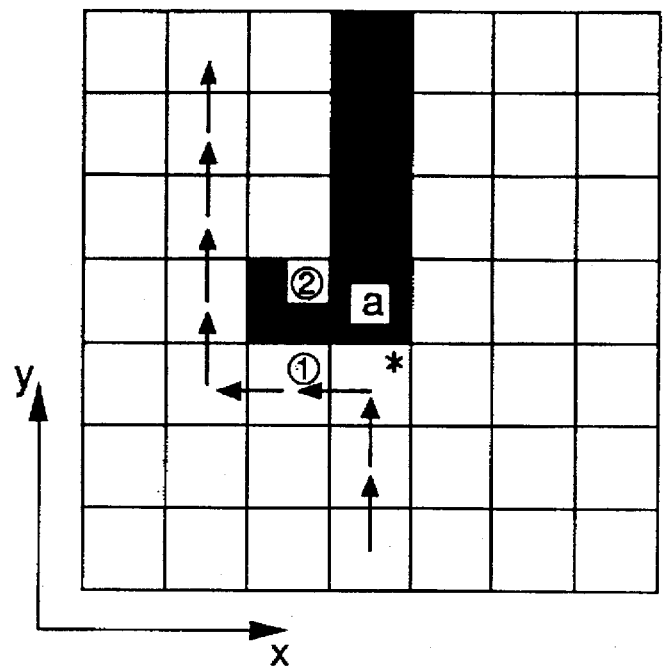
FIGS. 28A and 28B are diagrams showing the manner in which a segmentation partitioning line is generated by clockwise and counter-clockwise boundary tracing.

At step S705, the coordinates of P are stored in a register (Pm). Next, at step S706, the coordinates of P are shifted along the boundary line of the black-pixel area in the clockwise direction. For example, as shown in FIG. 28A, P is shifted upward one pixel at a time by movement of P. When a black pixel [a position indicated by "a" in FIG. 28A] is detected, P is not moved to the black-pixel position indicated by "a" and it is examined whether each pixel is a black pixel or white pixel by traveling in the clockwise direction with respect to this black pixel (the position indicated at "a") from the previous position (the position indicated by "*" in FIG. 28). In the case of FIG. 28A, the values of pixels are investigated in the order of pixel ①, pixel ②, ..., and so on. The next destination of movement for the tracing point P is decided based upon the point at which a black pixel is first detected. In the case shown in FIG. 28, pixel ① is the position of the next P coordinate. The position of the y coordinate of the next P is shifted upward and it is examined whether there is a black pixel at this position. In the case shown in FIG. 28, the value of pixel ② is investigated. Since pixel ② is a black pixel in the case of FIG. 28A, the value of each pixel is checked and black pixels are detected in the clockwise direction from the pixel ① so as to surround the pixel ②, and processing similar to the foregoing is executed to move the P coordinates. When processing is executed in this manner, the position of P is moved as indicated by the arrow in the case shown in FIG. 28A.

It is examined at step S707 whether the position of the moved point P has reached the upper end of the rectangle (in other word, it is examined whether upwardly partitioning of the character rectangle has been completed). If it is determined that the coordinate of P has reached the upper end of the rectangle, processing proceeds to step S751 and partitioning in the downward direction is attempted from the coordinate of P. If the coordinate of P has not reached the upper end of the rectangle, on the other hand, then processing proceeds to step S708. Here it is examined whether the y coordinate ($y_P$) of P has a value the same as that of the y coordinate ($y_{PS}$) of $P_S$. If it is found that $y_P=y_{PS}$ holds, then, despite the fact that partitioning upward from PS has been tried, the y coordinate of the partitioning position returns to the initial partitioning position owing to the value of the image-character pattern, as shown, for example, in FIG. 28B, and tracing of the partitioning positions proceeds in the downward direction. When it is determined that upward partitioning can no longer be performed even by clockwise tracing, this clockwise tracing is suspended, processing proceeds to step S712 and partitioning in the counter-clockwise direction is tried with the value set in the register $P_m$ serving as the starting point. If it is found that $y_P \neq y_{PS}$ holds, then processing proceeds to step S709.

Figure 27:
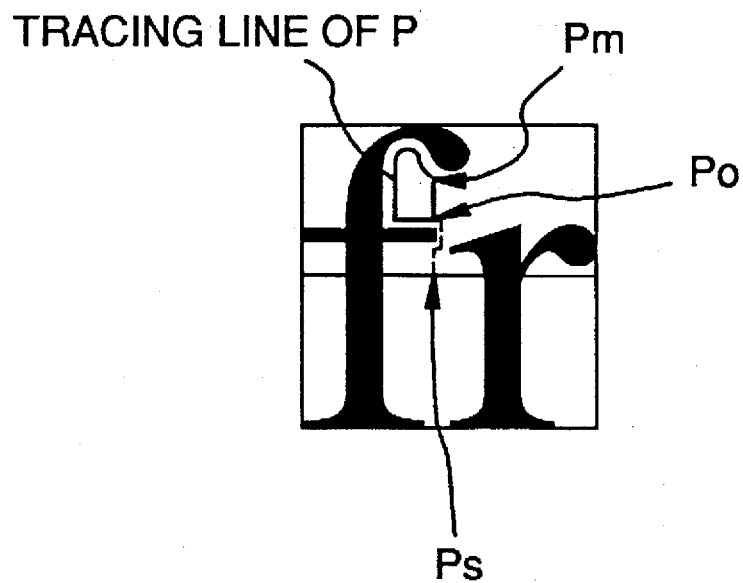
FIG. 27 is a diagram showing the manner in which a segmentation partitioning line based upon boundary tracing in a special character-image pattern is generated.

It is examined at step S709 whether the x coordinate ($x_P$) of P has a value the same as that of the x coordinate ($x_{PS}$) of $P_S$. If it is found that $x_P=x_{PS}$ holds, processing proceeds to step S710. If $x_P \neq x_{PS}$ holds, on the other hand, then processing returns to step S706 and boundary tracing is continued in the clockwise direction. It is examined at step S710 whether the tracing point P higher than Pm as a result of the fact that tracing has proceeded. If a position ($P_0$) at which the value of the x coordinate ($x_{PS}$) of P and the value of the x coordinate ($x_{PS}$) of PS coincide is present below Pm even if P is moved by tracing black pixels clockwise from $P_m$, then this point may be considered to be a point through which P has passed previously as shown in FIG. 27. Accordingly, if P is present below $P_m$, it is determined that clockwise tracing cannot be continued, clockwise tracing is suspended, processing proceeds to step S712 and partitioning in the counter-clockwise direction is tried with the value set in the register $P_m$ serving as the starting point. If P is present above $P_m$, on the other hand, processing proceeds to step S711 and it is examined whether the pixel one pixel above P is a black pixel. If it is a black pixel, then it is judged that the boundary line is still continuing, processing returns to step S706 and boundary tracing is continued in the clockwise direction. If the pixel one pixel above P is not a black pixel, processing returns to step S702 and the position of P is shifted upward again.

Processing for counter-clockwise tracing (steps S712~S718) will now be described.

Figure 28B:
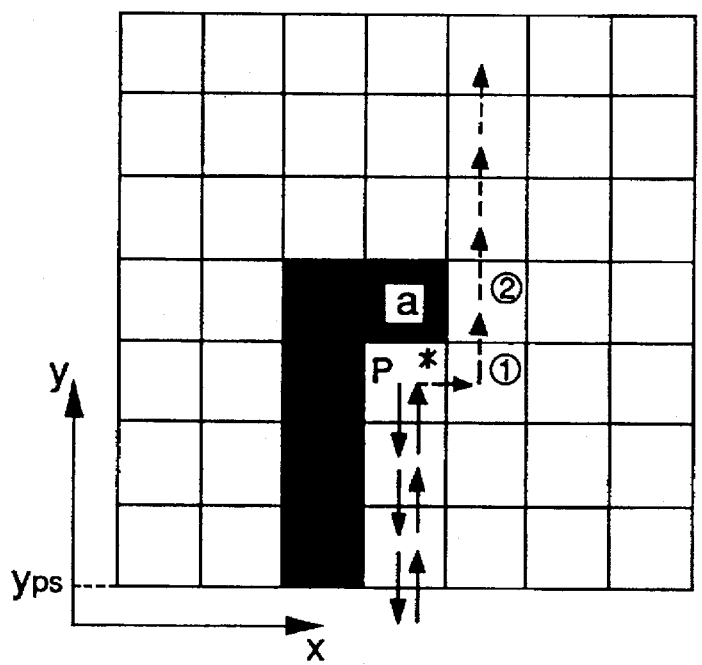

In a case where a character rectangle cannot be partitioned by clockwise tracing, processing proceeds to step S712, at which the saved coordinate of P is set in the register Pm so as to serve as the starting point of counter-clockwise tracing. At step S713, partitioning is tried by counter-clockwise tracing in the same manner as clockwise tracing at step S706. For example, in a case where a black pixel [the position indicated by "a" in FIG. 28B] is detected, as shown in FIG. 28B, it is examined whether each pixel is a black pixel or white pixel by traveling in the clockwise direction with respect to this black pixel (the position indicated at "a") from the previous position (the position indicated by "*" in FIG. 28B). In the case of FIG. 28B, the values of pixels are investigated in the order of pixel ①, pixel ②, ..., and so on. The next destination of movement for the tracing point P is decided based upon the point at which a black pixel is first detected. In the case shown in FIG. 28B, pixel ① is the position of the next P coordinate. Thereafter, processing is executed in the same manner as in clockwise tracing at steps S714~S718. When the conditions attained are such that tracing may be suspended, processing proceeds to step S719, it is judged that this character rectangle cannot be partitioned, and tracing is suspended.

If partitioning upward from $P_S$ has succeeded, then partitioning downward from $P_S$ is tried.

This processing is substantially the same as the upward partitioning processing already described. That is, steps S751~S755 represent processing for moving the tracing point downward and determining at such time whether there is a black pixel at the position to which P is shifted. This processing differs from that of upward partitioning in that the tracing direction of P is controlled so as to be downward and it is examined whether the coordinates of P have reached the lower end of the rectangle. Further, the processing for tracing the boundary of a black-pixel area in the clockwise direction is indicated at steps S756~S761, and the processing for tracing the boundary of a black-pixel area in the counter-clockwise direction is indicated at steps S762~S768. This processing differs from that of upward partitioning in that the tracing direction of P is controlled so as to be downward and it is determined whether the coordinates of P have reached the lower end of the rectangle.

If, by virtue of the foregoing processing, step S769 is finally attained and it is determined that the tracing point P has reached the lower end of the character rectangle, partitioning is terminated.

Figure 24D:
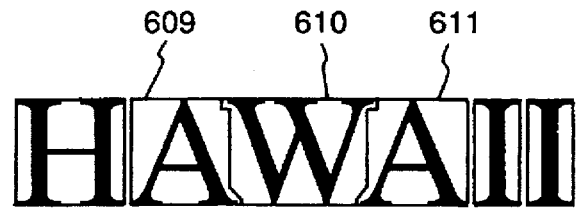

When the foregoing is considered upon returning to the character image shown in FIG. 24, the character rectangle 602 shown in FIG. 24B eventually is partitioned into three areas, namely character rectangles 609, 610 and 611 shown in FIG. 24D, and character segmentation processing ends.

Thus, in accordance with this embodiment, segmentation processing employing projection and segmentation processing by boundary tracing are used to make more accurate segmentation possible even when character images overlap. It is possible also to perform segmentation even when text is written in italic characters. Since boundary tracing is executed only under specific conditions, locations at which boundary tracing is executed are limited. As a result, overall segmentation processing can be executed at high speed.

In this embodiment, lines are drawn at half the height of the character rectangles and the mid-points on these lines of portions at which white pixels are continuous are regarded as being partitioning points. However, this does not impose a limitation upon the invention. For example, the position need be changed. Alternatively, a histogram of black pixels in the horizontal direction may be taken for every rectangle and a line may be drawn in the portion where the histogram is maximum. This will make it possible to reduce the number of partitioning positions and reduce the number of times second segmentation processing is executed. Furthermore, the mid-points of portions at which white pixels are continuous need not be regarded as being the partitioning points. Rather, the partitioning points may be points at which the values of pixels on the line change from those of black pixels to those of white pixels or from those of white pixels to those of black pixels.

[Seventh Embodiment (FIGS. 29~33)]

Segmentation processing will now be described in which neighboring characters contact each other, as in the character images shown in FIG. 39. In this embodiment also the character recognition apparatus used is the same as that shown in FIG. 9, and therefore common elements constituting the apparatus are designated by like reference characters. The apparatus need not be described in detail again.

Figure 29:
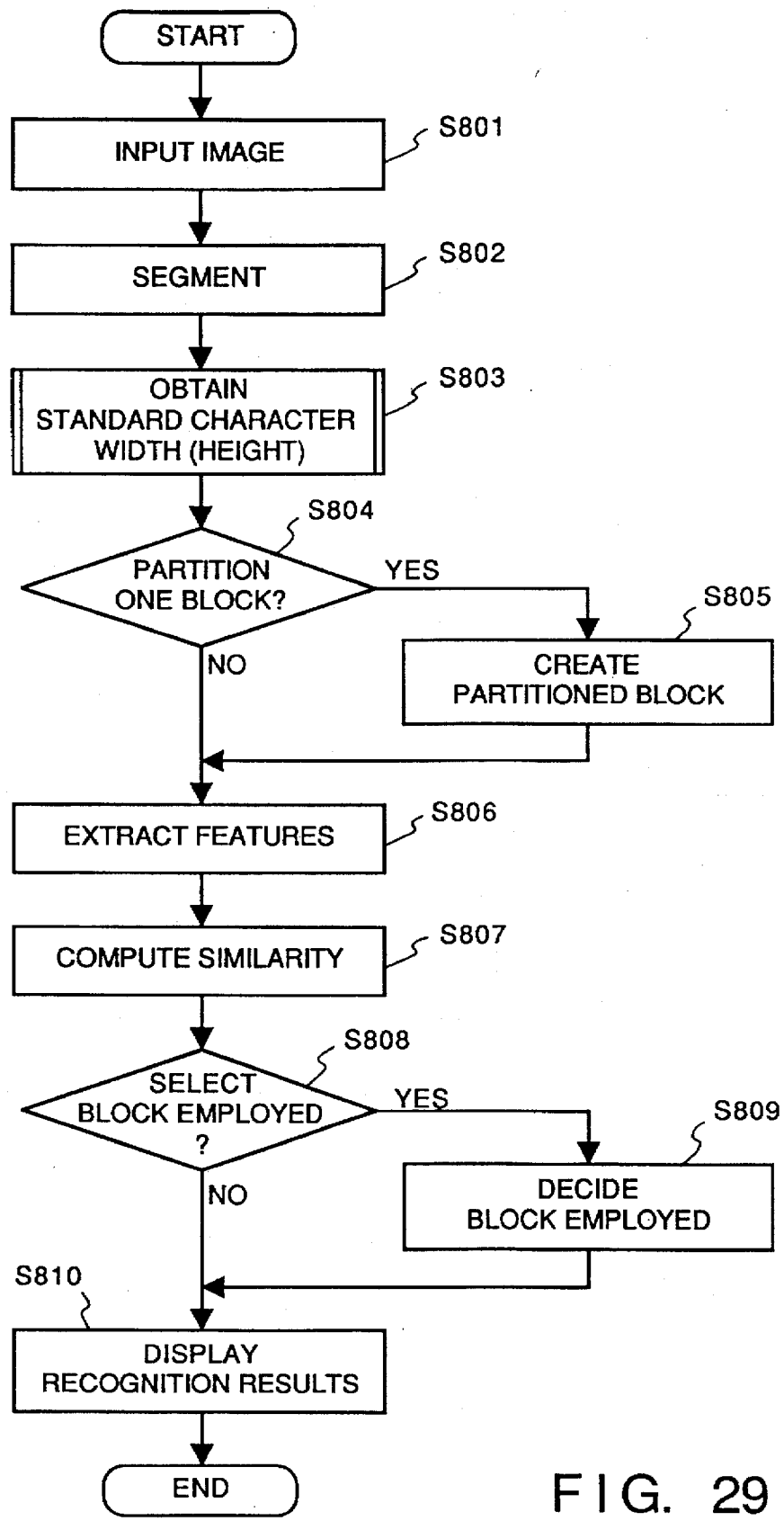
FIG. 29 is a flowchart showing character recognition processing in accordance with a seventh embodiment.

FIG. 29 is a flowchart showing segmentation processing according to this embodiment.

First, at step S801, the character images are inputted from the image scanner 107 and stored in the RAM 105. Next, at step S802, segmentation is performed by a method such as the projection method in accordance with the prior art. This is followed by step S803. Here, based upon segmented image-character frames (which shall be referred to as "blocks"), standard character width (W) is computed if the character image in the block is written laterally, and standard character height (H) is computed if the character image in the block is written vertically.

Figure 30:
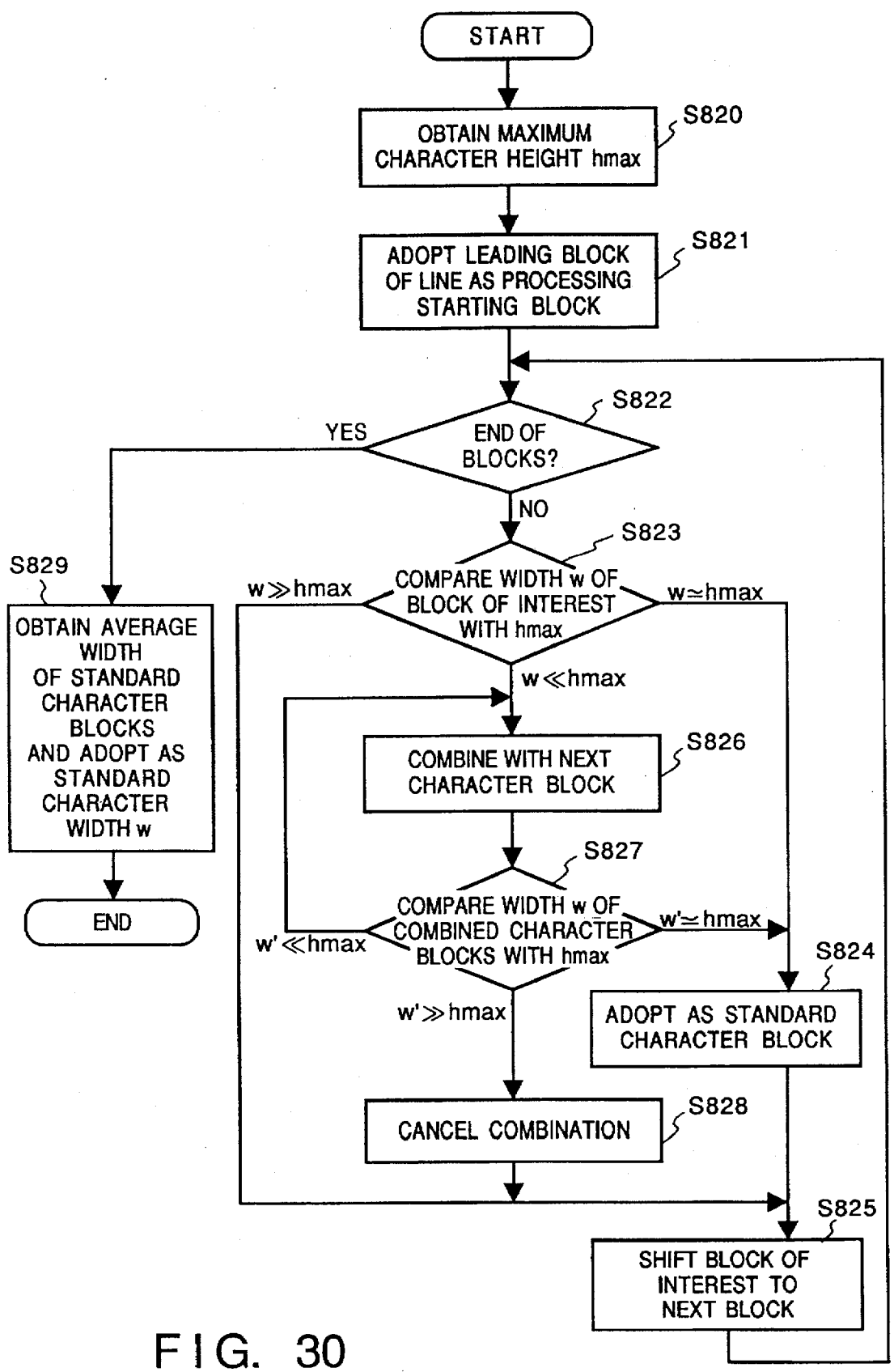
FIG. 30 is a flowchart showing processing for calculating a standard character width (height)

The details of processing for obtaining standard character width (W) will be described with reference to the flowchart shown in FIG. 30.

First, at step S820, the heights (h) of the blocks segmented at step S802 are searched to find the block having the maximum height. This height is represented by "hmax". Next, at step S821, the first block (e.g., the block on the left end) of a line of segmented character images is set as a processing starting block. It is then examined at step S822 whether all blocks on this line have been checked. If it is determined that all blocks on the line have been checked, processing proceeds to step S829; otherwise, the processing set forth below is executed until all blocks on the line have been checked.

The width (w) of the block of interest is compared with "hmax" at step S823. If w≃hmax holds (i.e., if the width of the block of interest is substantially equal to "hmax") then processing proceeds to step S824, at which this block is regarded as being a standard character block and is used to obtain the standard character width.

If w<<"hmax" holds (i.e., if the width of the block of interest is sufficiently small in comparison with "hmax"), however, then processing proceeds to step S826, the block is combined with the next block to form one block, processing proceeds to step S827 and the width (w') of the block is compared with "hmax". In a case where w'≃"hmax" holds (i.e., if the width of the combined block is substantially equal to "hmax"), then processing proceeds to step S824, at which this block is regarded as being a standard character block and is used to obtain the standard character width. If w'<<"hmax" holds (i.e., if the width of the combined block is still sufficiently small in comparison with "hmax"), however, then processing returns to step S826. If w'>>"hmax" holds (i.e., if the width of the combined block is very large in comparison with "hmax"), processing proceeds to step S828, this combining of blocks is canceled and processing proceeds to step S825.

If w>>"hmax" holds (if the width of the block of interest is very large in comparison with "hmax"), then processing proceeds to step S825.

The block of interest is shifted to the next block at step S825. If all blocks in the line have thus been checked, processing proceeds to step S829, where the average of the widths of the standard character blocks obtained is computed. This average value is adopted as the standard character width (W).

The foregoing description is directed to a case in which the standard character width (W) is obtained assuming that characters are written laterally. However, the standard character height (H) with regard to characters written vertically can be obtained if the lateral direction is replaced by the height direction and the vertical direction is replaced by the width direction.

It is examined at step S804 whether it is necessary to partition one block, which has been segmented by the processing of step S802, into a plurality blocks based upon the standard character width (height) obtained at step S803. In a case where the input character images are written laterally, for example, partitioning is judged to be necessary if the width of each character block segmented at step S802 exceeds the standard character width (W) obtained at step S802 by 1.5 times. If partitioning is judged to be necessary at step S804, then processing proceeds to step S805, where block partitioning is carried out.

Figure 31:
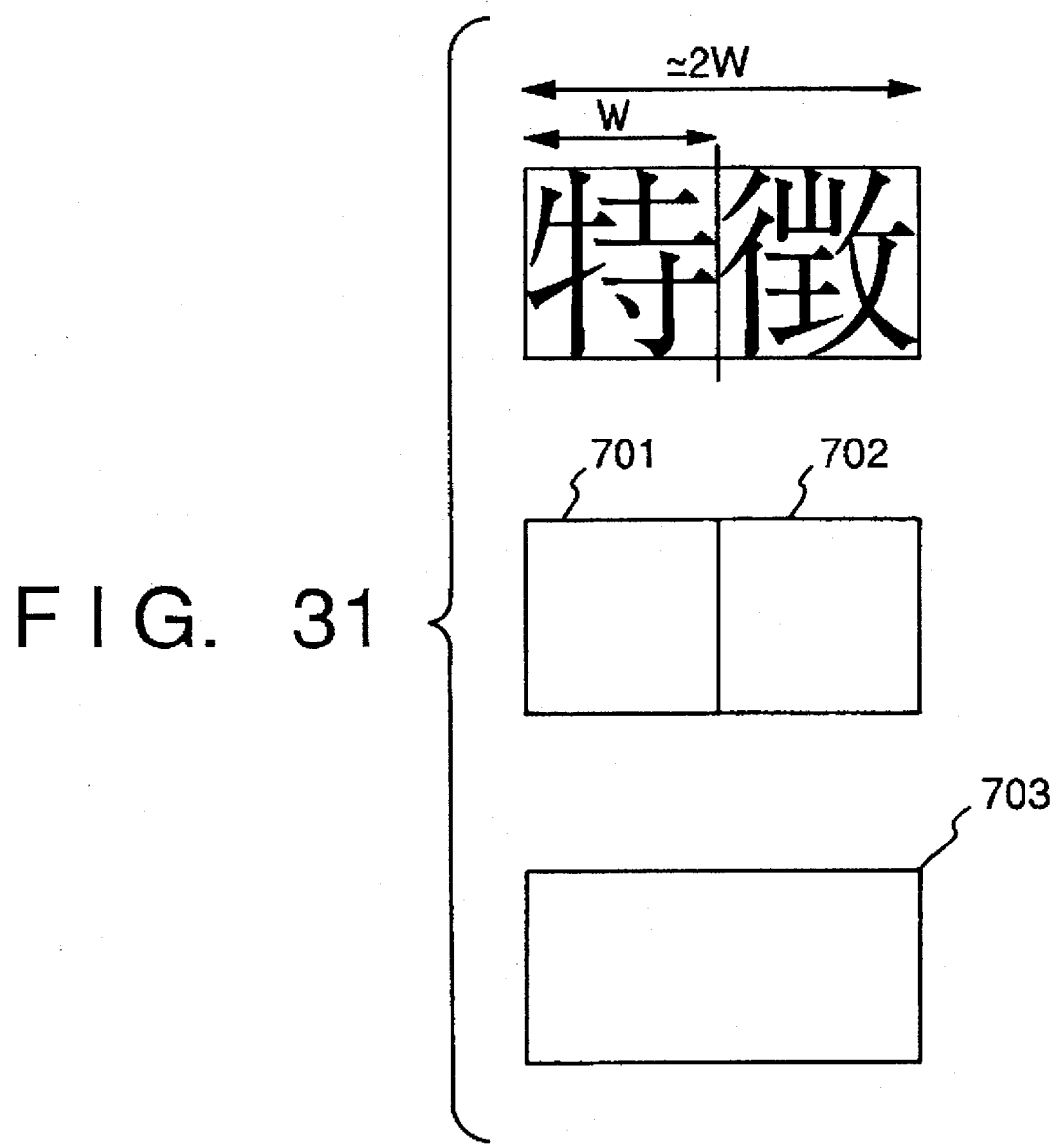
FIG. 31 is a diagram showing an example of the creation of partitioned blocks.

The processing for block partitioning executed at step S805 will now be described taking as an example laterally written Japanese character images in which neighboring blocks shown in FIGS. 31 and 32 contact each other and there is almost no spacing between characters. The character width of the character images ("*  *") shown in FIG. 31 is about 2W, and the value of this character width is substantially a whole-number multiple of the standard character width (W). Therefore, at step S805, three character blocks are formed, namely character blocks 701, 702 for a case in which the character image is partitioned every standard character width (W), and a character block 703 for a case in which partitioning is not carried out.

Figure 32:
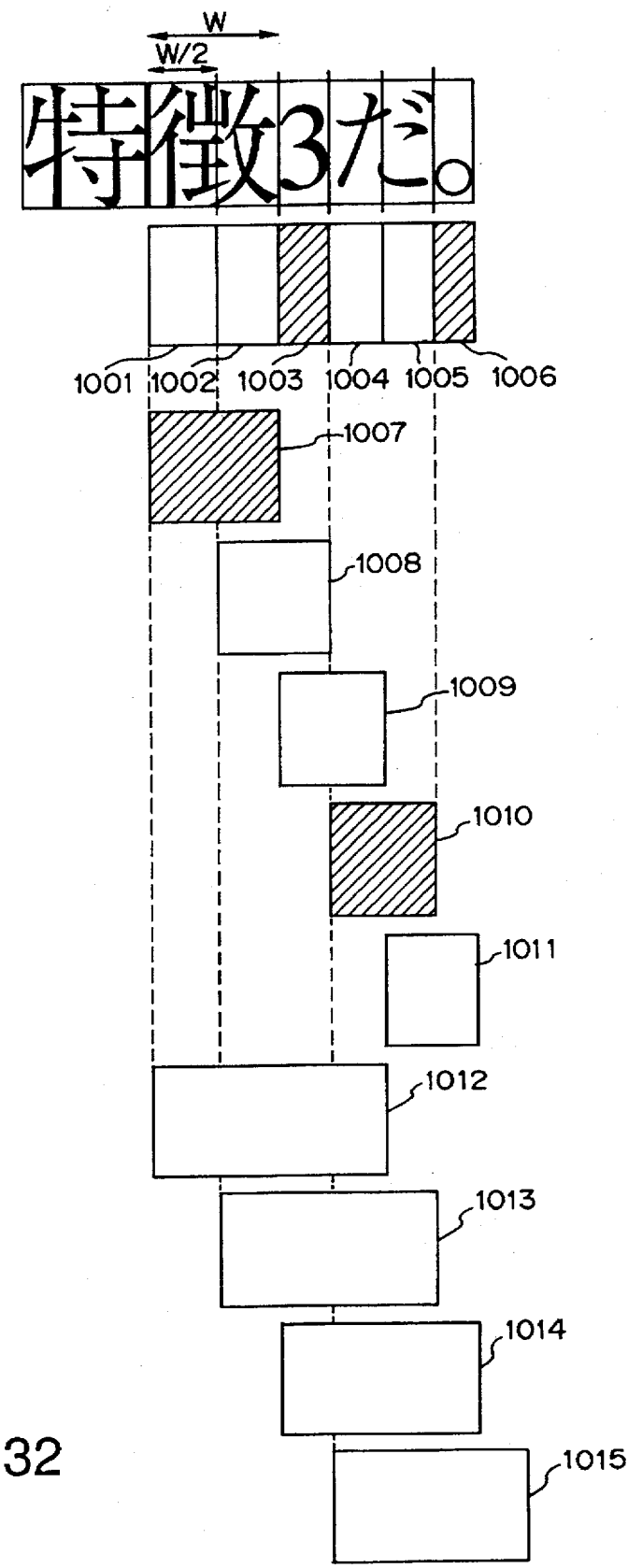
FIG. 32 is a diagram showing another example of the creation of partitioned blocks.

FIG. 32 shows an example for a complicated case in which the character image shown in FIG. 31 further includes a half-width character. In a case such as this, the presence of half-width characters or double-width characters is taken into account, half (W/2) of the standard character width is taken as the partitioning unit, and the formation of partitioned blocks is started if the width of a character block segmented at step S802 exceeds the standard character width by 1.5 times. In the case of this example, half-width blocks 1001~1006, full-width blocks 1007~1011 and double-width blocks 1012~1014 are formed.

On the basis of the character blocks thus formed, feature extraction is performed at step S806 and then similarity computation is performed at step S807.

Next, at step S808, it is examined whether block selection processing is to be carried out. In a case where block partitioning processing has not been performed with regard to a segmented character block, block selection processing is unnecessary and therefore processing proceeds from step S808 to step S810. Since block selection processing is required with regard to a character block which has undergone block partitioning processing at step S805, processing proceeds from step S808 to step S809. Here which block among the created blocks is to be employed is selected.

The block selection processing executed at step S809 will be described taking as an example the block partitioning illustrated in FIGS. 31 and 32.

In the case of the character images shown in FIG. 31, whichever of the blocks 701, 702 has a written character image of lesser similarity, which was computed at step S807, has the similarity of this character image compared with the similarity of the character image written in block 703. If the character image written in block 703 has a high degree of similarity, neither block 701 nor block 702 is made the selected block but block 703 is adopted as the block which is the result of segmentation. On the other hand, if the character image written in block 703 has a low degree of similarity, block 703 is not made the selected block. Instead, blocks 701 and 702 are adopted as the blocks which are the result of segmentation. In other words, in the example of the character images shown in FIG. 31, it is predicted that the similarity of the character image segmented by block 703 will be small. Therefore, even if the character images are close together and there is almost no spacing between characters, blocks 701 and 702 are selected as the results of segmentation.

Next, the character images shown in FIG. 32 will be considered. In this case also, as in the example of FIG. 31, blocks employed as the results of segmentation are decided from the left side using the blocks 1001~1014 while comparing the similarities of the character images written in the blocks.

More specifically, the block having the highest similarity from among the half-width block 1001, full-width block 1007 and double-width block 1012 is adopted as the final result of segmentation. On the assumption that the character image written in the full-width block 1007 is judged to have the highest similarity and this block 1007 is selected, a similar judgment is made at the half-width block 1003, full-width block 1009 and double-width block 1014. On the assumption that the half-width block 1003 has been selected, a similar judgment is made at the half-width block 1004, full-width block 1010 and double-width block 1015. If the result is that the full-width block 1010 is selected, the remaining block will be only the half-width block 1006, and therefore this will be employed as the segmented block. As the result of such processing, blocks 1007, 1003, 1010 and 1006 are selected.

The results of recognition thus obtained are displayed on the display 109 by the processing of step S810.

Thus, in accordance with this embodiment, in text (especially Japanese text) the major portion of which is composed of characters wherein the circumscribed rectangles of character images are substantially square, a parameter of standard character size is introduced, segmentation is performed, and similarities which are the result of character recognition executed based upon the segmentation are compared, whereby a result of segmentation having the highest degree of similarity is capable of being selected as the final segmentation. This makes highly accurate character recognition possible even if the characters in the above-mentioned text contact each other and characters of different sizes are mixed together in the text.

Figure 33:
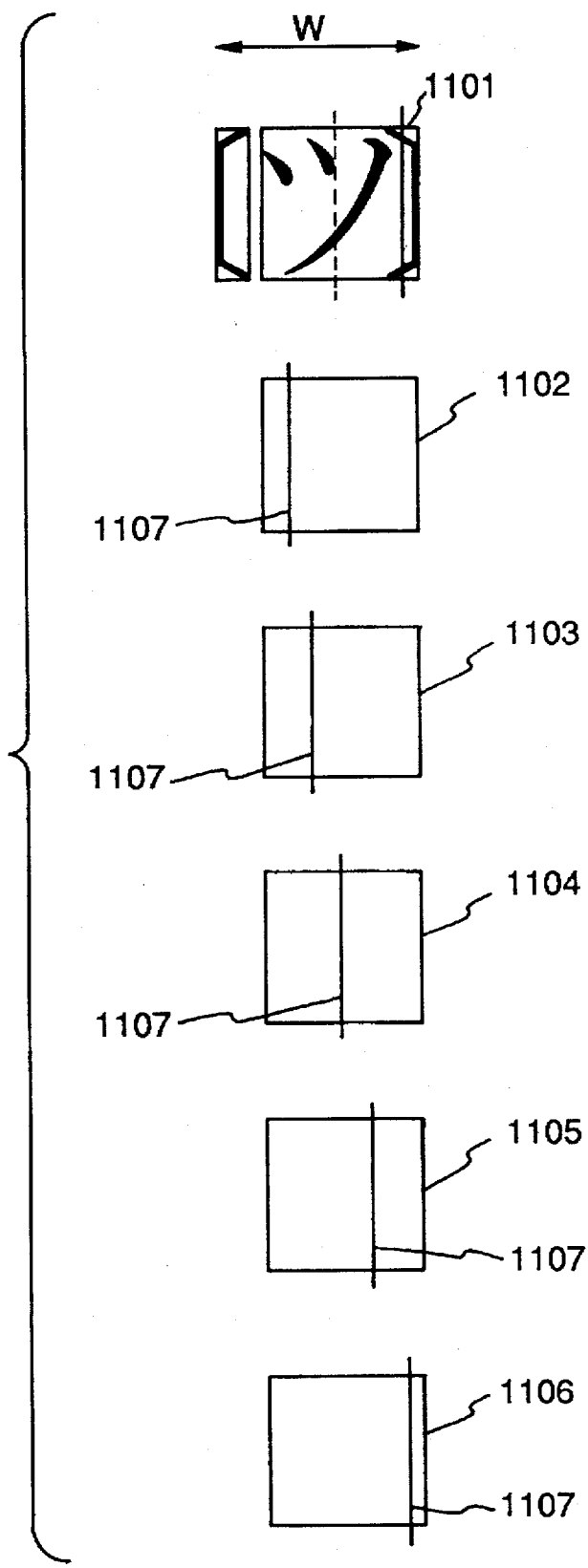
FIG. 33 is a diagram showing still another example of the creation of partitioned blocks.
Figure 34:
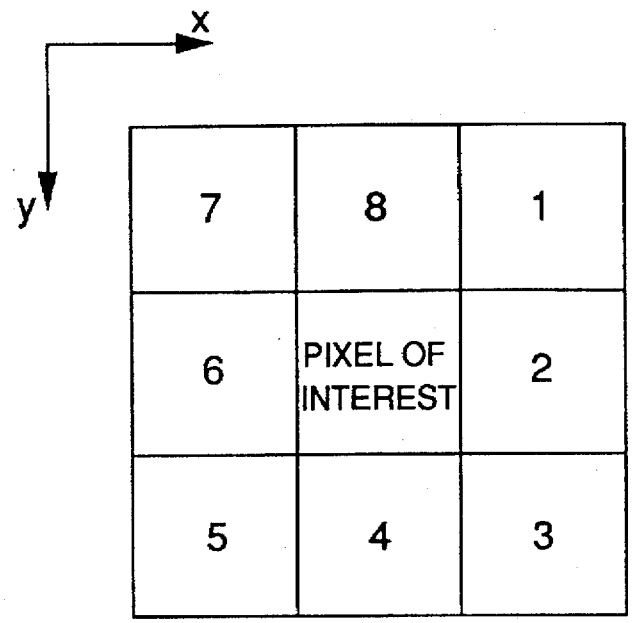
FIG. 34 is a diagram for describing character segmentation by the boundary tracing method in accordance with the prior art.
Figure 35:
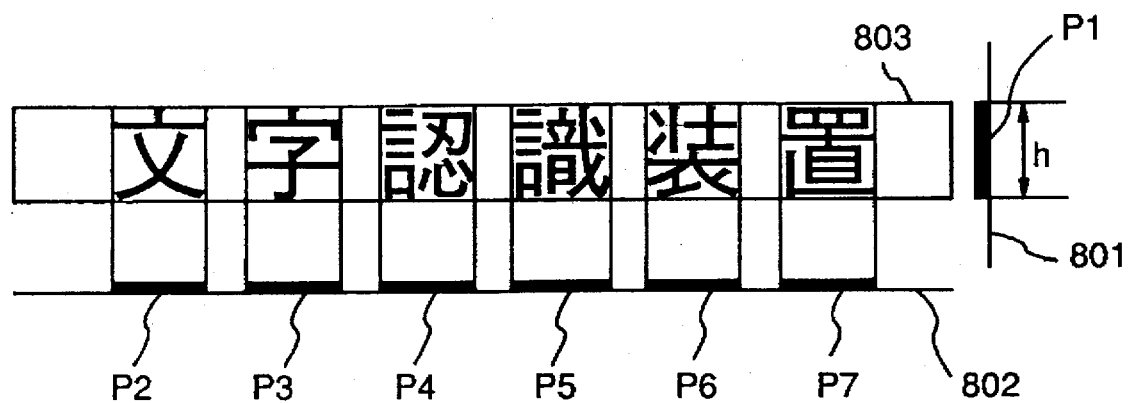
FIG. 35 is a diagram for describing character segmentation by the projection method in accordance with the prior art.
Figure 36:
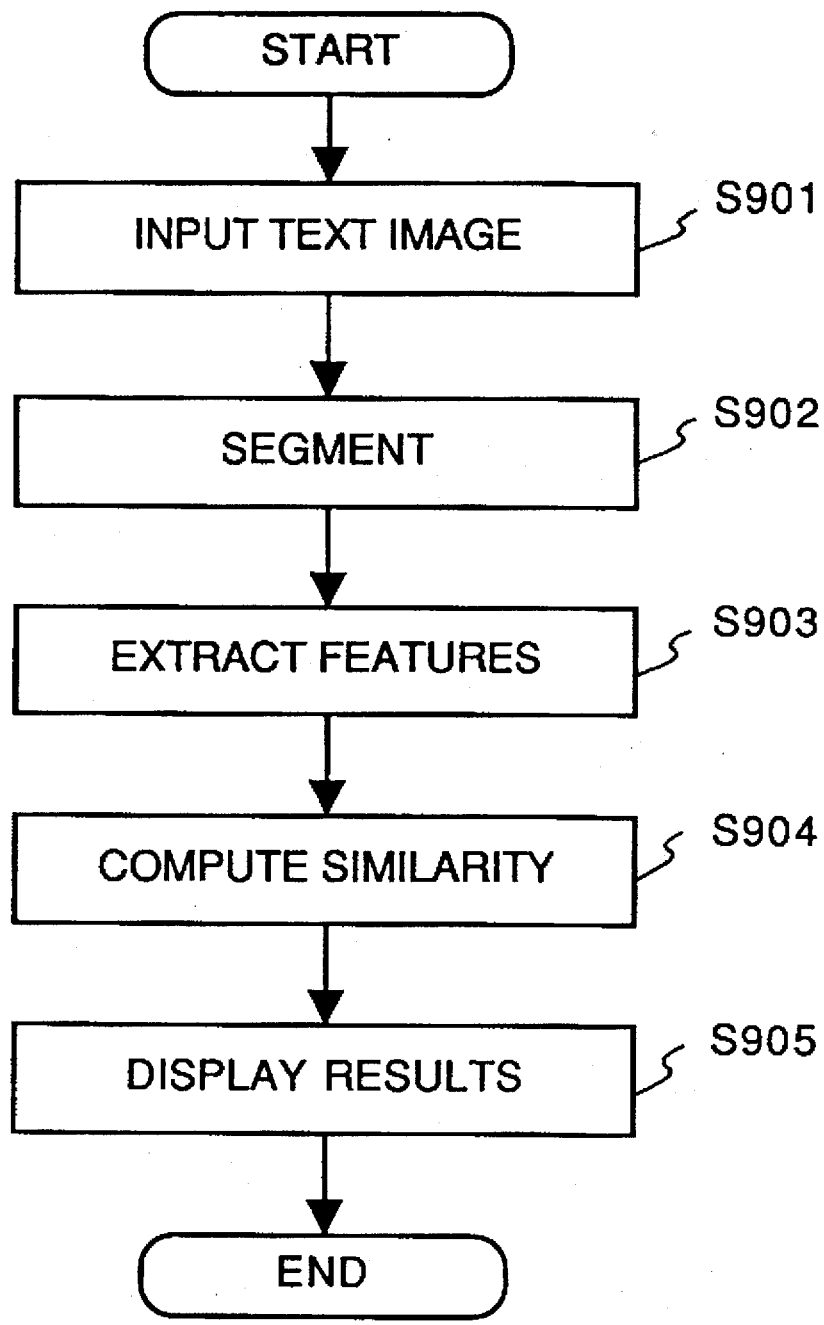
FIG. 36 is a flowchart showing character recognition processing according to the prior art.

Furthermore, in the present embodiment, the creation of partitioned blocks at step S805 is carried out using a length which is a whole-number multiple or whole-number fraction of the standard character width (W) or standard character height (H). However, this does not impose a limitation upon the invention. For example, consider a case in which neighboring characters contact each other and character images have been segmented as one block, and, moreover, the width of the block is only slightly larger than the standard character width (W), as shown in FIG. 33. In this case, correct recognition results are not obtained even if a partitioned block (block 1101 in FIG. 33) is created using a length which is a whole-number multiple or whole-number fraction of the standard character width (W). Therefore, as indicated at 1102~1106 in FIG. 33, processing is performed in such a manner that a plurality of partitioned patterns obtained by changing the position of a partitioning line 1107 little by little are created before the similarity computations are performed, and a combination having the highest degree of similarity is selected from among the partitioned patterns after the similarity computations are performed.

By virtue of this processing, highly accurate recognition results can be obtained even if characters having widths that differ greatly from the standard character width contact each other (as in English text, where character width differs greatly depending upon the character).

In the sixth and seventh embodiments, it is described that segmentation processing is executed by the CPU 101. However, this does not impose a limitation upon the invention. For example, it is possible to employ a character recognition apparatus of the kind having the construction described in the first embodiment, in which separate processors are used to execute the segmentation processing and character recognition processing.

Further, the device for inputting character images is not limited to the image scanner 107. If an external storage device is connected, then image data obtained by other means can be stored in this external storage device temporarily and then inputted from this device.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A character recognition method comprising:
   an input step of inputting an image original;
   a segmentation step of segmenting character image blocks, which are written in said image original inputted by said input step;
   a recognition step of performing character recognition by comparing extracted features of the segmented character image blocks with information that has been stored in a prescribed character dictionary, and obtaining a degree of similarity;
   a setting step of setting identification information indicating whether or not each of the segmented character image blocks requires resegmentation based on the degree of similarity;
   a generation step of generating, for a group of consecutive segmented character image blocks that require resegmentation based on the identification information, a plurality of new character image blocks by using all possible consecutive combinations of the segmented character image blocks in the group that begin with a first segmented character image block in the group, subject to the condition that each new character image block has a width which is within a predetermined value;

a repetition control step of repeatedly returning to said recognition step so as to perform character recognition on the plurality of new character image blocks; and an output step of outputting a recognition result of the new character image block having the highest degree of similarity among the plurality of new character image blocks which have been generated in said generation step and subjected to character recognition in said recognition step, as a recognition result for a resegmented image block.

2. A character recognition apparatus comprising:

input means for inputting an image original;

segmentation means for segmenting character image blocks which are written in the image original inputted by said input means;

recognition means for performing character recognition by comparing extracted features of said segmented character image blocks with information that has been stored in a prescribed character dictionary, and obtaining a degree of similarity;

setting means for setting identification information indicating whether or not each of the segmented character image blocks requires resegmentation based on the degree of similarity;

generation means for generating, for a group of consecutive segmented character image blocks that, based on the identification information, require resegmentation, a plurality of a new character image blocks by using all possible consecutive combinations of the segmented character image blocks in the group that begin with a first segmented character image block in the group, subject to the condition that each new character image block has a width which is within a predetermined value;

control means for controlling said recognition means for performing character recognition on the plurality of new character image blocks; and output means for outputting a recognition result of the new character image block having the highest degree of similarity among the plurality of new character image blocks which have been generated by said generation means and subjected to character recognition by said recognition means, as a recognition result for a resegmented image block.

3. The apparatus according to claim 2, wherein processing by said recognition means is executed each time character image blocks written in the image original are segmented at a predetermined length at a time.

4. The apparatus according to claim 2, wherein processing by said recognition means is executed each time character image blocks written in the image original are segmented one character at a time.

5. A character recognition method comprising:

an input step of inputting an image original;

a first segmentation step of segmenting a character image block written in the image original inputted by said input step according to a projection method;

an evaluation step of evaluating the character image block segmented by said first segmentation step and determining whether further segmentation is possible;

a trace start point decision step of determining an appropriate position from white pixels in one segmented character image block as a trace start point if it is determined in said evaluation step that further segmentation is possible; and a second segmentation step of tracing white pixels in the segmented character image block from the determined trace start point toward a direction along which the tracing partitions the segmented character image block, and segmenting the segmented character image block along the traced white pixels.

6. The method according to claim 5, wherein said second segmentation step includes:

a tracing step of tracing white pixels, in which characters have not been written, in up-down and left-right directions in the segmented character image block using the determined trace start point; and a partitioning step of partitioning the segmented character image block along a tracing line obtained by said tracing step.

7. The method according to claim 6, wherein when a pixel in which a character has been written is detected in tracing of the white pixels in which characters have not been written in up-down and left-right directions from the determined trace start point, said tracing step includes checking connectivity of the pixel in which the character has been written and performing further tracing of white pixels in which characters have not been written by detouring in a direction in which pixels in which characters have not been written exist.

8. The method according to claim 5, wherein the determined trace start point is taken in an area wherein pixels in which characters have not been written are continuous, the determined trace start point lying on a straight line passing through a prescribed position of a character image block segmented by said first segmentation step.

9. The method according to claim 8, wherein said prescribed position through which said straight line passes is a mid-point in relation to the up-down direction of said segmented character image block.

10. A character recognition apparatus comprising:

input means for inputting an image original;

first segmentation means for segmenting a character image block written in the image original inputted by said input means according to a projection method;

evaluation means for evaluating the character image block segmented by said first segmentation means and determining whether further segmentation is possible;

trace start point decision means for determining an appropriate position from white pixels in one segmented character image block as a trace start point if it is determined by said evaluation means that further segmentation is possible; and second segmentation means for tracing white pixels in the segmented character image block from the determined trace start point toward a direction along which the tracing partitions the segmented character image block, and segmenting the segmented character image block along the traced white pixels.

11. The apparatus according to claim 10, wherein said second segmentation means includes:

tracing means for tracing white pixels, in which characters have not been written, in up-down and left-right directions in the segmented character image block using the determined trace start point; and partitioning means for partitioning the segmented character image block along a tracing line obtained by said tracing means.

12. The apparatus according to claim 11, wherein said tracing means includes:

connectivity examining means which, when a pixel in which a character has been written is detected in tracing of the white pixels in which characters have not been written in up-down and left-right directions from the determined trace start point, is for checking connectivity of the pixel in which the character has been written; and detouring means for performing further tracing of white pixels in which characters have not been written by detouring in a direction in which pixels in which characters have not been written exist in accordance with results of the examination by said connectivity examining means.

13. The apparatus according to claim 10, wherein the determined trace start point is taken in an area wherein pixels in which characters have not been written are continuous, the determined trace start point lying on a straight line passing through a prescribed position of a character image block segmented by said first segmentation means.

14. The apparatus according to claim 13, wherein said prescribed position through which said straight line passes is a mid-point in relation to the up-down direction of said segmented character image block.

15. The apparatus according to claim 2, wherein said input means includes a scanner for scanning the image original.

16. The apparatus according to claim 10, wherein said input means includes a scanner for scanning the image original.

17. A computer program product comprising a computer readable medium having computer program code, for executing character recognition, said product including:

input process procedure codes for inputting an image original;

segmentation process procedure codes for segmenting character image blocks, which are written in the inputted image original;

recognition process procedure codes for performing character recognition by comparing extracted features of the segmented character image blocks with information that has been stored in a prescribed character dictionary, and obtaining a degree of similarity;

setting process procedure codes for setting identification information indicating whether or not each of the segmented character image blocks requires resegmentation based on the degree of similarity;

generation process procedure codes for generating, for a group of consecutive segmented character image blocks that require resegmentation, a plurality of new character image blocks by using all possible consecutive combinations of the segmented character image blocks in the group that begin with a first segmented character image block in the group, subject to the condition that each new character image block has a width which is within a predetermined value;

control process procedure codes for controlling execution of character recognition on the plurality of new character image blocks by said recognition process procedure codes; and output process procedure codes for outputting a recognition result of the new character image block having the highest degree of similarity among the plurality of new character image blocks which have been generated by execution of said generation process procedure codes and subjected to character recognition by execution of said recognition process procedure codes, as a recognition result for a resegmented image block.

18. A computer program product comprising a computer readable medium having computer program code, for executing character recognition, said product including:

input process procedure codes for inputting an image original;

first segmentation process procedure codes for segmenting a character image block written in the inputted image original according to a projection method;

evaluation process procedure codes for evaluating the character image block segmented by executing said first segmentation process procedure codes and determining whether further segmentation is possible;

trace start point decision process procedure codes for determining an appropriate position from white pixels in one segmented character image block as a trace start point if it is determined by executing said evaluation process procedure codes that further segmentation is possible;

second segmentation process procedure codes for tracing white pixels in the segmented character image block from the determined trace start point toward a direction along which the tracing partitions the segmented character image block, and segmenting the segmented character image block along the traced white pixels.

* * * * *

UNITED STATES PATENT AND TRADEMARK OFFICE
CERTIFICATE OF CORRECTION

PATENT NO. : 5,684,891

DATED : November 4, 1997

INVENTORS : Tanaka et al.

It is certified that error appears in the above-identified patent and that said Letters Patent is hereby corrected as shown below:

On the title page item [56],
<u>REFERENCES CITED</u>

FOREIGN PATENT DOCUMENTS

"1037681" should read --1-037681--.

<u>COLUMN 7</u>

Line 66, "With" should read --with--.

<u>COLUMN 17</u>

Line 9, "B4" should read --B4,--.

Signed and Sealed this

Twenty-eighth Day of April, 1998

Attest:

BRUCE LEHMAN

*Attesting Officer*     *Commissioner of Patents and Trademarks*